US011356345B2

(12) United States Patent
Hines et al.

(10) Patent No.: US 11,356,345 B2
(45) Date of Patent: Jun. 7, 2022

(54) NETWORKING DATA ANALYSIS IN A VISUAL SPREADSHEET

(71) Applicant: Gigasheet, Inc., Leesburg, VA (US)

(72) Inventors: Jason Hines, Leesburg, VA (US); Abraham Usher, Herndon, VA (US); Garth Griffin, Somerville, MA (US)

(73) Assignee: GIGASHEET, INC., Leesburg, VA (US)

( * ) Notice: Subject to any disclaimer, the term of this patent is extended or adjusted under 35 U.S.C. 154(b) by 0 days.

(21) Appl. No.: 17/499,379

(22) Filed: Oct. 12, 2021

(65) Prior Publication Data

US 2022/0116291 A1 Apr. 14, 2022

Related U.S. Application Data

(60) Provisional application No. 63/091,526, filed on Oct. 14, 2020.

(51) Int. Cl.
*H04L 43/045* (2022.01)
*H04L 43/062* (2022.01)
*H04L 9/40* (2022.01)

(52) U.S. Cl.
CPC .......... *H04L 43/045* (2013.01); *H04L 43/062* (2013.01); *H04L 63/1425* (2013.01); *H04L 63/20* (2013.01)

(58) Field of Classification Search
CPC . H04L 43/045; H04L 43/062; H04L 63/1425; H04L 63/20
See application file for complete search history.

(56) References Cited

U.S. PATENT DOCUMENTS

| | | | | |
|---|---|---|---|---|
| 9,830,368 B1 * | 11/2017 | Otala | G06F 8/41 |
| 10,229,105 B1 * | 3/2019 | Cao | G06F 7/24 |
| 10,311,043 B2 * | 6/2019 | Giuca | G06F 16/332 |
| 2013/0144894 A1 * | 6/2013 | DeStefano | H04L 63/1416 707/755 |
| 2016/0335163 A1 * | 11/2016 | Teodorescu | G06F 3/04847 |
| 2019/0057125 A1 * | 2/2019 | Kim | G06F 16/2358 |
| 2020/0174989 A1 * | 6/2020 | Koza | G06F 16/2358 |

* cited by examiner

*Primary Examiner* — Beemnet W Dada
(74) *Attorney, Agent, or Firm* — Baker Botts L.L.P.

(57) ABSTRACT

In an embodiment, a method comprises, by a networking data analysis system: receiving, from a client device, computer files, each computer file comprising log data; transforming each of the computer files, the transforming comprising: converting the log data associated with the computer files into a structured tabular representation of the log data; parsing the structured tabular representation of the log data to extract data elements associated with the log data and to identify data types associated with the data elements; creating a columnar representation of the log data based on the identified data types; storing the columnar representation of the log data in a columnar database; executing computer-implemented functions on the columnar representation of the log data to identify key networking security metrics; sending, to the client device, instructions for displaying the identified key networking security metrics associated with the log data of the one or more computer files.

7 Claims, 19 Drawing Sheets

404 408 402

| $SI Created | $SI Modified | File Name | File Path | File Size | File MD5 | File Attributes | File Deleted |
|---|---|---|---|---|---|---|---|
| 2019-10-14 23:13:04 | 2019-10-14 23:33:45 | Default.rdp | C:\Users\attacker\Documents\ | 485 | 476b45bf6cdb2f9729c59907ddfc1444 | Archive | FALSE |
| 2019-10-14 23:13:06 | 2019-10-14 23:33:49 | sample.exe | C:\Users\admin\ | 2345 | c482e563df19a401941c99888ac2f526 | Archive | FALSE |
| 2019-10-14 23:13:08 | 2019-10-14 23:34:25 | text.doc | C:\Users\admin\ | 789 | b2f67358c9ad7e5944fb68feb5de2dd8 | Archive | FALSE |
| 2019-10-14 23:13:10 | 2019-10-14 23:34:23 | myword.doc | C:\Users\admin\ | 44555 | c482e563df19a401941c99888ac2f528 | Archive | FALSE |
| 2019-10-14 23:13:12 | 2019-10-14 23:34:29 | some.xls | C:\Users\admin\ | 8787 | 476b45bfdcdb2f9729c59907ddfc1444 | Archive | FALSE |
| 2019-10-14 23:13:14 | 2019-10-15 23:34:29 | Default2.rdp | C:\Users\attacker\Documents\ | 3434 | a482e563df19a401941c99888ac2f530 | Archive | TRUE |
| 2019-10-14 23:13:16 | 2019-10-16 23:34:29 | sys.log | C:\ | 34898 | c082e563df19a401941c93388ac2f531 | Archive | FALSE |
| 2019-10-14 23:14:18 | 2019-10-17 23:34:29 | text.doc | C:\Users\admin\ | 333 | c482e563df19a401941c99888ac2f532 | Archive | FALSE |
| 2019-10-14 23:14:20 | 2019-10-18 23:34:29 | myword.doc | C:\Users\admin\ | 995 | b2f67358c9ad7e5944fb65beb5de2d20 | Archive | FALSE |
| 2019-10-14 23:14:22 | 2019-10-19 23:34:29 | some.xls | C:\Users\admin\ | 3456986 | b582e563df19a401941c94488ac2f533 | Archive | FALSE |
| 2019-10-14 23:14:24 | 2019-10-20 23:34:29 | text.doc | C:\Users\admin\ | 344 | c482e563df19a401941c9988ac2f534 | Archive | FALSE |
| 2019-10-14 23:14:26 | 2019-10-21 23:34:29 | myword.doc | C:\Users\admin\ | 486 | a232e563df19a401941c90888ac2f536 | Archive | FALSE |
| 2019-10-14 23:14:28 | 2019-10-22 23:34:29 | some.xls | C:\Users\admin\ | 45 | d212e563df19a401941c99888ac2f530 | Archive | FALSE |

| Event Gen Time | Event ID | Event Message | Event Category | Event User | Event System |
|---|---|---|---|---|---|
| 2019-10-14 23:12:36<br>Event Gen Time | 4948 | A logon was attempted using explicit credentials.<br>Subject:<br>Security ID: DomainCorp\Administrator | Logon | Administrator | SourceSystem |
| 2019-10-15 23:13:01<br>Event Gen Time | 4689 | A process has exited.<br>Subject:<br>Security ID: WIN-R9H529RIO4Y\Administrator<br>Account Name: Administrator<br>Account Domain: WIN-R9H529RIO4Y | Process Tracking | Administrator | SourceSystem |
| 2019-10-16 23:13:06<br>Event Gen Time | 4790 | An LDAP query group was created.<br>Subject:<br>Security ID: ACME\administrator<br>Account Name: administrator<br>Account Domain: ACME<br>Logon ID: 0x30999 | Account Management | Administrator | SourceSystem |
| 2019-10-17 23:13:36<br>Event Gen Time | 4648 | A logon was attempted using explicit credentials.<br>Subject:<br>Security ID: DomainCorp\Administrator<br>Account Name: Administrator<br>Account Domain: DomainCorp<br>Logon ID: 0x1b38fe<br>Logon GUID: {00000000-0000-0000-0000-000000000000}<br>Account Whose Credentials Were Used:<br>Account Name: VictimUser<br>Account Domain: DomainCorp | Logon | Administrator | SourceSystem |
| 2019-10-18 23:14:56<br>Event Gen Time | 4648 | A logon was attempted using explicit credentials.<br>Subject:<br>Security ID: DomainCorp\Administrator<br>Account Name: Administrator<br>Account Domain: DomainCorp<br>Logon ID: 0x1b38fe<br>Logon GUID: {00000000-0000-0000-0000-000000000000} | Logon | Administrator | SourceSystem |

| KeyModified | Key Path | KeyName | ValueName | ValueText | Type |
|---|---|---|---|---|---|
| 2019-10-14 23:33:46 | HKEY_USER\Software\Microsoft\Terminal Sever Client\Servers\ | DestinationServer | UsernameHint | VictimUser | REG_SZ |
| 2019-10-15 23:34:02 | HKEY_USER\Software\Microsoft\Terminal Sever Client\Servers\ | DestinationServer | UsernameHint | VictimUser2 | REG_SZ |

<table>
<tr><th>$SI Modified</th><th>Timestamp Type</th><th>Summary</th></tr>
<tr><td>2019-10-14 23:12:36</td><td>Event Gen Time</td><td>4648 | A logon was attempted using explicit credentials.</td></tr>
<tr><td>2019-10-14 23:13:04</td><td>File Created</td><td>Default.rdp | C:\Users\attacker\Documents\ | 485 | c482e563df19a401941c99888ac2f525 | Archive | FALSE</td></tr>
<tr><td>2019-10-14 23:13:06</td><td>File Created</td><td>sample.exe | C:\Users\admin\ | 2345 | c482e563df19a401941c99888ac2f526 | Archive | FALSE</td></tr>
<tr><td>2019-10-14 23:13:08</td><td>File Created</td><td>text.doc | C:\Users\admin\ | 789 | c482e563df19a401941c99888ac2f527 | Archive | FALSE</td></tr>
<tr><td>2019-10-14 23:13:10</td><td>File Created</td><td>myword.doc | C:\Users\admin\ | 44555 | c482e563df19a401941c99888ac2f528 | Archive | FALSE</td></tr>
<tr><td>2019-10-14 23:13:12</td><td>File Created</td><td>some.xls | C:\Users\admin\ | 8787 | c482e563df19a401941c99888ac2f529 | Archive | FALSE</td></tr>
<tr><td>2019-10-14 23:13:14</td><td>File Created</td><td>Default2.rdp | C:\Users\attacker\Documents\ | 3434 | c482e563df19a401941c99888ac2f530 | Archive | TRUE</td></tr>
<tr><td>2019-10-14 23:13:16</td><td>File Created</td><td>sys.log | C:\ | 34898 | c482e563df19a401941c99888ac2f531 | Archive | FALSE</td></tr>
<tr><td>2019-10-14 23:14:18</td><td>File Created</td><td>text.doc | C:\Users\admin\ | 333 | c482e563df19a401941c99888ac2f532 | Archive | FALSE</td></tr>
<tr><td>2019-10-14 23:14:20</td><td>File Created</td><td>myword.doc | C:\Users\admin\ | 995 | c462e563df19a401941c99888ac2f533 | Archive | FALSE</td></tr>
<tr><td>2019-10-14 23:14:22</td><td>File Created</td><td>some.xls | C:\Users\admin\ | 3456986 | c482e563df19a401941c99886ac2f534 | Archive | FALSE</td></tr>
<tr><td>2019-10-14 23:14:24</td><td>File Created</td><td>text.doc | C:\Users\admin\ | 344 | c482e563df19a401941c99888ac2f535 | Archive | FALSE</td></tr>
<tr><td>2019-10-14 23:14:26</td><td>File Created</td><td>myword.doc | C:\Users\admin\ | 486 | c482e563df19a401941c99868ac2f536 | Archive | FALSE</td></tr>
<tr><td>2019-10-14 23:14:28</td><td>File Created</td><td>some.xls | C:\Users\admin\ | 45 | c482e563df19a401941c99888ac2f537 | Archive | FALSE</td></tr>
<tr><td>2019-10-14 23:33:45</td><td>File Modified</td><td>Default.rdp | C:\Users\attacker\Documents\ | 485 | c482e563df19a401941c99886ac2f525 | Archive | FALSE</td></tr>
<tr><td>2019-10-14 23:33:46</td><td>KeyModified</td><td>HKEY _USER\Software\Microsoft\Terminal Server Client\Servers\ | DestinationServer | UsernameHint | VictimUser | REG_SZ</td></tr>
<tr><td>2019-10-14 23:33:49</td><td>File Modified</td><td>sample.exe | C:\Users\admin\ | 2345 | c482e563df19a401941c99888ac2f526 | Archive | FALSE</td></tr>
<tr><td>2019-10-14 23:34:15</td><td>File Modified</td><td>text.doc | C:\Users\admin\ | 789 | c482e563df19a401941c99888ac2f527 | Archive | FALSE</td></tr>
<tr><td>2019-10-14 23:34:23</td><td>File Modified</td><td>myword.doc | C:\Users\admin\ | 445551c482e563df19a401941c99888ac2f528 | Archive | FALSE</td></tr>
<tr><td>2019-10-14 23:34:29</td><td>File Modified</td><td>some.xls | C:\Users\admin\ | 8787 | c482e563df19a401941c99888ac2f529 | Archive | FALSE</td></tr>
<tr><td>2019-10-15 23:13:01</td><td>Event Gen Time</td><td>4689 | A process has exited.</td></tr>
<tr><td>2019-10-15 23:34:02</td><td>KeyModified</td><td>HKEY_USER\Software\Microsoft\Terminal Server Client\Servers\ | DestinationServer | UsernameHint | VictimUser2 | REG_SZ</td></tr>
<tr><td>2019-10-15 23:34:29</td><td>File Modified</td><td>Default2.rdp | C:\Users\attacker\Documents\ | 3434 | c462e563df19a401941c99688ac2f530 | Archive | TRUE</td></tr>
<tr><td>2019-10-16 23:13:06</td><td>Event Gen Time</td><td>4790 | An LDAP query group was created.</td></tr>
<tr><td>2019-10-16 23:34:29</td><td>File Modified</td><td>sys.log | C:\ | 34898 | c482e563df19a401941c99888ac2f531 | Archive | FALSE</td></tr>
<tr><td>2019-10-17 23:13:36</td><td>Event Gen Time</td><td>4648 | A logon was attempted using explicit credentials.</td></tr>
<tr><td>2019-10-17 23:34:29</td><td>File Modified</td><td>text.doc | C:\Users\admin\ | 333 | c482e563df19a401941c99888ac2f532 | Archive | FALSE</td></tr>
<tr><td>2019-10-18 23:14:56</td><td>Event Gen Time</td><td>4648 | A logon was attempted using explicit credentials.</td></tr>
<tr><td>2019-10-18 23:34:29</td><td>File Modified</td><td>myword.doc | C:\Users\admin\ | 995 | c482e563df19a401941c99888ac2f533 | Archive | FALSE</td></tr>
<tr><td>2019-10-19 23:16:06</td><td>Event Gen Time</td><td>4648 | A logon was attempted using explicit credentials.</td></tr>
</table>

Columns

1100

1108

| A | B | C |
|---|---|---|
| 1612799899 | IP | 10.2.8.101.49672 |
| 1612799899 | IP | 10.2.8.2.389 |
| 1612799899 | IP | 10.2.8.101.49672 |
| 1612799899 | IP | 10.2.8.101.49672 |
| 1612799899 | IP | 10.2.8.2.389 |
| 1612799899 | IP | 10.2.8.2.389 |
| 1612799899 | IP | 10.2.8.101.49672 |
| 1612799899 | IP | 10.2.8.101.49673 |
| 1612799899 | IP | 10.2.8.2.88 |
| 1612799899 | IP | 10.2.8.101.49673 |
| 1612799899 | IP | 10.2.8.101.49673 |
| 1612799899 | IP | 10.2.8.2.88 |
| 1612799899 | IP | 10.2.8.101.49673 |
| 1612799899 | IP | 10.2.8.2.88 |
| 1612799899 | IP | 10.2.8.2.88 |
| 1612799899 | IP | 10.2.8.101.49674 |
| 1612799899 | IP | 10.2.8.2.88 |

*FIG. 11*

| GROUP ≡ | A ≡ | B ≡ | C ≡ |
|---|---|---|---|
| ▷ 185.100.65.... (5308) | | | 185.100.65.29.80 |
| ▷ 10.2.8.101.49... (4291) | | | 10.2.8.101.49763 |
| ▷ 198.211.10.23... (1317) | | | 198.211.10.238.443 |
| ▷ 198.211.10.23... (1263) | | | 198.211.10.238.80... |
| ▷ 173.223.201.1... (492) | | | 173.223.201.150.80 |
| ▷ 45.124.85.5... (427) | | | 45.124.85.55.80 |
| ▷ 10.2.8.2.445 (240) | | | 10.2.8.2.445 |
| ▷ 10.2.8.101.49 (209) | | | 10.2.8.101.49732 |
| ▷ 8.208.10.147.... (207) | | | 8.208.10.147.80 |
| ▷ 10.2.8.101.49... (187) | | | 10.2.8.101.49681 |
| ▷ 10.2.8.2.389 (183) | | | 10.2.8.2.389 |
| ▷ 162.241.149.1... (167) | | | 162.241.149.195.4... |
| ▷ 52.109.6.42.... (137) | | | 52.109.6.42.443 |
| ▷ 10.2.8.2.88 (120) | | | 10.2.8.2.88 |
| ▷ 10.2.8.101.49 (105) | | | 10.2.8.101.49757 |
| ▷ 10.2.8.101.497 (93) | | | 10.2.8.101.49758 |

| GROUP ≡ | A ≡ | B ≡ | C ≡ |
|---|---|---|---|
| ▽ 185.100.65.... (5308) | | | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |
| ↳ | 1612800018 | IP | 185.100.65.29.80 |

NETWORKING DATA ANALYSIS IN A VISUAL SPREADSHEET

BENEFIT CLAIM

This application claims the benefit under 35 U.S.C. § 119(e) of provisional application 63/091,526, filed Oct. 14, 2020, the entire contents of which are hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2020-2021 Gigasheet, Inc.

TECHNICAL FIELD

One technical field of the present disclosure is computer-implemented processes for digital data ingest, normalization, storage, and transformation using visual spreadsheet cells, and data analytics. Another technical field is computer network security and internetworking security.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

According to a 2018 Threat Hunting Survey conducted by security firm AlertLogic, widespread cybersecurity attacks have driven nearly every business to increase resources spent on incident response, and while most would like to engage in threat hunting to proactively fend off attackers, less than half realize this objective. The costs of security investigations to organizations are high in terms of dollars, but also resources. Advanced incident response and threat hunting requires specialized technical skills, and substantial IT infrastructure which must be heavily customized.

The prominence of security incidents continues to increase at an alarming rate with no signs of receding. Organizations are seeking new solutions in order to avoid heavy financial losses post incident, the need to adhere to industry and legal compliance requirements, and in some recent cases to avert military escalation and loss of human life.

Security investigations, both proactive and reactive, require analysts to sift through a tsunami of data logs (millions to billions of data points) searching for indicators of compromise (IOCs), or evidence of these attackers. Due to the high costs and complexities, organizations make do with ill-suited tools, custom built one-off solutions or hire expensive consultants in an attempt to fend for themselves against foreign militaries and well-funded criminal organizations.

Media publication Venturebeat states there will be an estimated 3.5 million unfilled positions in cybersecurity in 2021. Insatiable demand is leading to many new entrants in the security industry, who have high potential but lack years of experience in "dark arts." In order for the security labor force to meet demand, the industry must become more welcoming to diverse backgrounds and overcome its secret society reputation. Powerful but esoteric code libraries and applications require months of specialized training and lead organizations to search for nonexistent "unicorn" candidates—people with slews of certifications . . . long tenures in the industry . . . and specialized skills in not one, but several, tech stacks and disciplines (from cloud security to app sec and compliance).

Many security analysts lack expert database knowledge or advanced programming skills, and therefore have few options to quickly analyze large data sets (millions or billions of data points). They wrestle to enrich data with intelligence from third-party sources where data fields and formats may not align exactly. Even teams which are highly skilled (and highly paid) often spend long periods of time in data preparation and enrichment, with little time left for analysis.

Security investigations often involve a number of systems and solutions that utilize differing and/or customized logging. These analysts must normalize, timeline and enrich this data to understand the event and how to best secure their systems.

While generic analysis products (like Excel) aid business users, and complex log management systems (like Splunk) help dev ops teams, there is a dearth of no-code, low-training solutions for quick exploration and analysis. Advancements in data analysis tools could bring dramatic improvements to the efficiency and effectiveness of tasks performed by incident responders and threat hunters.

Security information and event management (SIEMs) and log management solutions typically provide real-time analysis of events and manage security alerts generated by applications and network hardware. Many vendors sell these solutions as software, appliances, or managed services; regardless of the format these products' primary objective is to log security events and generate reports for compliance purposes.

SIEMs and Log Management solutions require significant IT support and investment, as well as a high degree of technical skill. They typically require data architects to properly normalize the data and configure the systems to work with internal data stores. These efforts can typically take many months of setup and configuration.

These systems are focused on real-time analysis and monitoring, and therefore limit the historical log data and are ill suited for static file analysis. When it comes to forensic investigations and proactive hunting, SIEMs and log management systems are only as good as the data that it has been configured to monitor, and because of storage restrictions and the need to maintaining a highly available production environment, it's often missing voluminous, low interest logs—which is exactly where attackers aim to hide their tracks.

It is not trivial to add new data sources to these systems which requires extensive set up and configuration by system administrators. Costly hardware infrastructure and software licenses further restrict data organizations put into their SIEM and log management systems. Hunt platforms are often an upsell or add-on capability. While the aim is generally promising, these functions are not the core focus of the manufacturer, and they fall short for those conducting incident response and threat hunting.

Disadvantages of these prior techniques include:

Requires extensive setup and configuration. It commonly takes months to properly configure a SIEM system and can require anywhere from four to eight full-time security analysts to keep it running efficiently;

Before any analysis can be done, requires users to scope their needs, procure hardware and complete installation of multiple applications, and deploy or integrate with countless sensors across the network;

Intended for real-time monitoring and ongoing IT performance analysis rather than historic and forensic data analysis;

Due to the complexity of these systems, users must learn proprietary query languages and query structures; and End users are not allowed to add more data by design; this is reserved for administrators.

Numerous Business Intelligence (BI) and spreadsheet software tools exist, including Tableau, Qlik, Google Sheets, and Excel. These alternatives do not have capacity to handle data sets with tens of millions of rows without a database back-end and are limited by the memory (RAM) and power (CPU) of the user's PC. They lack security specific features (e.g., native IOC data types like URLs and IP, communication pattern analysis) and do not support more complex queries required by security analysts. Users settle for clunky workarounds to transform the data and shallow analytics. Disadvantages of these approaches include the following.

Fixed limitations on amount of data (Excel 1,048,576 rows, Google Sheets 5 million cells); BI tools can support more, but require data to be loaded into a database first.

Performance is based on local machine CPU and memory. The software spreadsheet assumes users will want to view and edit any cell at any time, which is a feature that is not necessary in security investigations and is actually another drawback of spreadsheets because it is important to maintain the integrity of forensic evidence.

Spreadsheets and BI tools are built primarily for financial and business analysis. These tools lack native support of cell formats or data types for IPv4 and IPv6 address formats, CIDR notation, and URL structure. In addition, current BI and spreadsheet applications do not consider the graph structure of network data, and do not offer methods to visualize network graphs. Graph, in this context, refers to data structures formed of nodes connected by edges, rather than visual graphing.

Are not built to normalize data from different log sources (e.g., firewalls, IDS, system event logs) or common open source security systems like OSSEC (Open Source HIDS SECurity) or Zeek. Users often struggle to join data from different sources which have different formats.

Cannot open or distill events from pcap (packet capture) files.

Often takes many steps and complex formulas to normalize date/times to UTC format, a standard time format used in security investigations.

No native ability to enrich data by fetching information, such as threat intelligence, from third-party web APIs.

Lacks intelligent guidance on how to best analyze common security data logs.

Based on the foregoing, there is a clear need in the specified technical fields for improved techniques to ingest, normalize, store, and transform, and provide other management and manipulation functions for digital data relating to computer network security and internetworking security using visual spreadsheet cells, and data analytics and techniques that are specifically engineered for use in the network security domain.

BRIEF DESCRIPTION OF DRAWINGS

FIG. 4A, FIG. 4B, FIG. 4C, FIG. 4D illustrate example logs from different systems with different formats and headings that may be combined based on the automatic time-based summarization.

FIG. 11 illustrates an example GUI implementation of a group-by technique.

SUMMARY

Figure 1:
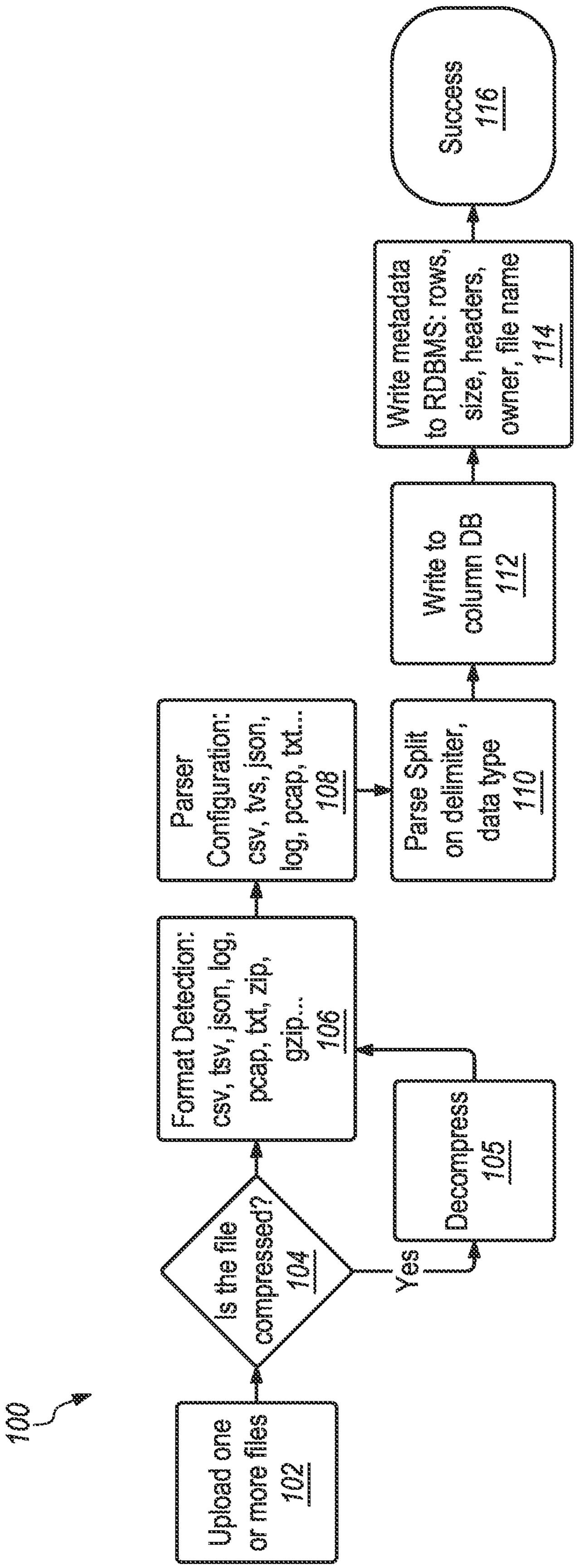
FIG. 1 illustrates an example log file transform process.

The appended claims may serve as a summary of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

1. Overview

The networking data analysis system offers a turnkey data workbench for security analysts and investigators with a spreadsheet-like interface that requires very little training, offers context through enrichment and powerful analytics. For the security analyst who wants more powerful tools without the complexity of a large footprint tech stack, this system provides a familiar environment for the discovery, interpretation, and communication of meaningful patterns in massive security data sets. The networking data analysis system can take less than ten minutes for a user to launch and begin using and adds efficiency and automation to the manual process. Numerous system data enrichments add implied features (geolocation, country, city, local-time, IPv4 risk score). A comprehensive API coupled with a spreadsheet-like User Interface (UI) provides users with an intuitive environment for exploratory data analysis. Constructed with a cloud-native design, incoming data is stored in a secure multi-tenant environment.

Cybersecurity investigators are proactively (threat hunters) and reactively (incident responders) searching through troves of network data and logs to detect and isolate advanced threats that evade existing security solutions. The networking data analysis system of this disclosure is an ideal solution for these users because it allows for easy import, normalization, merging, and exploration of multi-million row data sets. The application recognizes common security data types, and smartly automates calculations, aggregations and metrics that are specific to security analysts' needs. Where a typical spreadsheet is built with finance in mind, this system is focused on needs of security. Instead of providing tools for financial modelling, the networking data analysis system offers analytics for analyzing network traffic, operating system logs, enriching data from third-party threat intelligence services, and normalizing multiple log formats.

Enrichment from third-party intelligence sources takes seconds, a task that even with the best resources takes hours of configuration and data normalization. Hunting Guides automate analytic flows based on learned patterns of experts. The data sets and actions added by users are anonymized and then used in models to develop proprietary threat hunting guides and unique intelligence feeds.

The networking data analysis system includes machine learning algorithms that automate the detection of several classes of advanced persistent threat (APT) and criminal activity. Using a combination of data from the explicit features of security logs and the novel enrichments that are added in the processes of extracting, transforming, and loading data, the networking data analysis system reduces the time required to get to relevant insights.

In one embodiment, a computer-implemented method for network security investigations comprises executing, by one or more computer devices of a networking data analysis system: receiving, from a client device associated with a user, one or more computer files, each computer file comprising log data; transforming each of the one or more computer files, the transforming comprising: converting the log data associated with the computer files into a structured tabular representation of the log data; parsing the structured tabular representation of the log data to extract data elements associated with the log data and to identify data types associated with the data elements; creating a columnar representation of the log data based on the identified data types; storing the columnar representation of the log data in a columnar database; executing one or more computer-implemented functions on the columnar representation of the log data to identify key networking security metrics; sending, to the client device, instructions for displaying the identified key networking security metrics associated with the log data of the one or more computer files.

In one feature, the method can comprise extracting metadata associated with the data elements; storing the extracted metadata in a relational database management system. In another feature, the one or more computer files can include a first computer file with a first log data and a second computer file with a second log data. In a further feature, the transforming can comprise determining, upon receiving a request from the client device to combine the first computer file with the second computer file, that the first computer file is compatible to the second computer file based on one or more of a column order, a column count, and the data types associated with the data elements of the log data; combining the first computer file with the second computer file into a combined file; the columnar representation of the log data corresponding to the combined file.

In yet another feature, the transformation can further comprise determining that the first log data or the second log data comprises a time-based data element that is not formatted in a Coordinated Universal Time (UTC) format; converting the time-based data element that is not formatted in the UTC format into the UTC format In various embodiments, each of the one or more computer-implemented functions for identifying the key networking security metrics can be any of: returning a number of occurrences of each unique value of the log data; returning a number of occurrences of each unique data element of the data elements; returning a number of unique elements with a user-specified characteristic of interest divided by a total number of unique data element of the data elements; returning the log data in a pivot table; returning a number of occurrences of a pair of two unique values of the log data, the two unique values being separated in two different columns; returning, for each pair of two unique values of the log data that are in columns specified by a user, respectively, a sum of the pair of two unique values.

Other embodiments, aspects, and features of the disclosure will become apparent from the other sections herein and the foregoing represents only example embodiments, aspects, and features of the disclosure.

2. Security Analyst Workbench

In an embodiment, the networking data analysis system interface disclosed herein is visually similar to a conventional spreadsheet application but is implemented using new, unconventional foundation algorithms. Embodiments disclosed herein allow users to work with massive amounts of data (e.g., billions rows in a single sheet), whereas a typical spreadsheet or BI application may only allow users to analyze a few million rows of data before requiring the user to offload the data into a database or data warehouse for further analysis. The networking data analysis system, according to one embodiment, is optimized for forensic security data and logs and is able to achieve an impressive scalability through:

Loose coupling of UI and data storage—the User Interface is implemented in HTML/Javascript and custom built for visually representing large data sets;

Efficient data representation—content is stored in a high performance column-store database that allows compression and attribute specific optimizations providing speed enhancements of ten to a hundred times over traditional general purpose relational databases; and Cloud native parallelism—operations that require active processing can be distributed across a pool of "job workers" that scale horizontally and use the near infinite capacity of commercial cloud providers.

In a traditional spreadsheet application, any cell may be edited, and frequent small reads and writes are important. In an embodiment, the networking data analysis system, according to one embodiment, may limit users from editing cells to maintain forensic integrity of the data to allow resources to be shifted to performing analytical calculations. In an embodiment, the back end datastore is designed for handling large volumes of data, read and write tasks, and made to be highly available to potential, upcoming tasks. In an embodiment, the frontend is designed for data analytics and data transformation.

Typical spreadsheet applications allow the user to scroll and view every cell. However, security investigators rarely need to view every line of a large file, and therefore the entire data set does not need to be loaded into memory on the user's machine. Unlike typical spreadsheet applications, embodiments disclosed herein do not store formulas cells, but may be used to transform the data based on filtered rows/columns rather than the entire data set, e.g., transformation of all cells in all rows under one column, or creation of a new column based on existing column data and such. Such features allow for maximum speed and scale. Additionally, the networking data analysis system interface disclosed herein has the following key features:

Artifact/Log extract-transform-load and Summarization;

Advanced Data Filters for IOCs; and

Pattern Identification.

3. Artifact Extraction, Transformation, Loading, and Summarization

When a cybersecurity incident occurs, investigators' first order of business is to gather relevant logs and other forensic data, commonly referred to as artifacts. These analysts rarely have standardized parsing and analysis tools. Typically, data comes from a variety of systems and solutions that utilize custom logging or tools, which may collect corrupted or highly incompatible data from infected systems.

Because artifacts often come from multiple systems and/or forensic collection tools, each with their own custom formats, it is difficult to view and compare multiple types of data in the same view. Each artifact is typically one file on a computer disk. Analysts must normalize artifacts to perform their analysis. The networking data analysis system, according to one embodiment, automates this otherwise cumbersome process.

FIG. 1 illustrates an example file transform process of automated normalization of network data that could be used in one embodiment. The example program flow 100 of FIG. 1 starts at block 102 at which one or more files are uploaded to the system from a user device. As shown in FIG. 1, when a user uploads a file to the networking data analysis system, according to one embodiment, the system programmatically processes the file and converts it into a structured tabular representation of the content. At block 104, the system checks if the file matches a known compression algorithm, if so, at block 105, decompresses the file.

At block 106, the system is programmed to detect a format of each file that was uploaded. At block 108, the system is programmed to determine what type of parser should be used on the files. In an embodiment, the system may use a JSON parser for files in JSON format, a delimited parser for files in a delimited format, and other parsers may be used for other formats such as Apache logs, Squid proxy logs, packet capture files, or etc. After identifying the type of parser, the system is programmed to configure the corresponding parser for the specifics of the file, then at block 110, executes the parser.

In an embodiment, the system is programmed to split data in the file based upon different values or characters. For example, the system may first analyze a sample of lines from the file and search for common delimiters (e.g., comma, tab, semicolon). Then, the system may split the file based on the identified delimiter. If no common delimiter can be identified, the system is programmed to walk through each character on the sample lines, record the frequencies of each, and nominate candidate delimiters (e.g., candidate delimiters that appear more than once at regular intervals on each line). For each candidate delimiter, the deviation of its frequency per line may be calculated. If the deviation is low, the system may programmatically determine that it likely is a delimiter. The various parser types each have their own configuration requirements, which can be of varying levels of complexity.

In an embodiment, the system determines all required configuration values for the parser to operate on the specific input file. The configuration is done by inspecting the file, or in the case of a very large file, inspecting a portion of the file. For a delimited file parser, this inspection reveals the delimiter as described above as well as other characters that play a role in the format of the file, including the line terminator, which is determined by looking for patterns of characters adjacent to the newline character in the file, or field quotation characters, which are determined by looking at patterns of characters adjacent to the delimiter character. These patterns may be captured by regular expressions. For a JSON parser, this inspection looks at how the contents of the file are split across newlines. The system tests whether each single is a valid JSON string on its own. If it is, then the system has determined that the file must be parsed line by line with a new JSON document generated for each line, and each document will become one row of the table. Alternatively, if the entire file is a single valid JSON string, then the system has determined that one JSON document will be generated for the entire file, and the rows of the table will be extracted from within that single document. Other parser types have their own specific configuration actions, but in all cases the system uses inspection of the file to reveal the specific parameters needed to accurately extract the contents from the particular file format.

In addition to determining how to extract the character strings for the data values, in an embodiment, the system may programmatically determine the data types in each of the files. For example, the system detects email addresses by looking for patterns that match RFC 5322, e.g., qualifying characters followed by an at symbol "@" or additional qualifying characters followed by a dot "." followed by additional qualifying characters and IPv4 addresses by a pattern matching method looking for decimal dot notation as specified in RFC 791. The system may use similar techniques to identify IPv6 addresses, URLs, common data time formats, as well as other data types. In one implementation, typical data types supported by a backend database of the system may include: Array, Date, DateTime('timezone')/DateTime64('timezone'), Decimal, Enumerated Type, Int8/

16/32/64, IPv4/IPv6, Float32/64, Nested, Set, String/FixedString(N), UInt8/16/32/64, UUID. In an embodiment, if data type cannot be identified, a String type may be assigned.

Once a parser has been fully configured as described above, in an embodiment, the system may programmatically use that parser to parse the entire input file. At block 112, the system is programmed to write the output to a columnar database. Regardless of the input format, the output of the parsing step is placed in a tabular database. In an embodiment, the tabular database is structured such that a table represents an input file, rows in that table represent individual entries from the input file, and columns in that row represent the different fields of that entry in the file. The data type of the column in the database corresponds to the type selected for that field in the input file during the configuration of the parser. In one implementation, the tabular output is stored in a tabular database using INSERT operations in SQL.

Optionally, in an embodiment, the system may allow a user to override the automatic column delimiter detection and data type detection, for example, by specifying the delimiter and data types for each column.

After the entirety of the input file has been parsed and stored in this way, at block 114 the system is programmed to create a separate entry in another database that stores metadata about the file. The metadata may include the total number of rows parsed from the file, when the file was parsed, the original filename, the owner of the file, the names of the columns, whether the user would like to make the parsed data visible to colleagues, and other information that applies to the file as a whole. At block 116, the file transform process ends.

In an embodiment, as data is uploaded and added to the system the original source files are maintained in a secure "raw data" file store.

Once parsing of a file is complete, in an embodiment, users may add additional rows of data from another file, even if the columns and data types do not match. When the user selects a file with rows to be appended, the system checks whether file column order, count, and corresponding data types match the existing table. If the new data format does not match the existing file, the system may be programmed to prompt a user to select which columns to add and ask to match the new data to existing columns of the same data type.

Figure 2A:
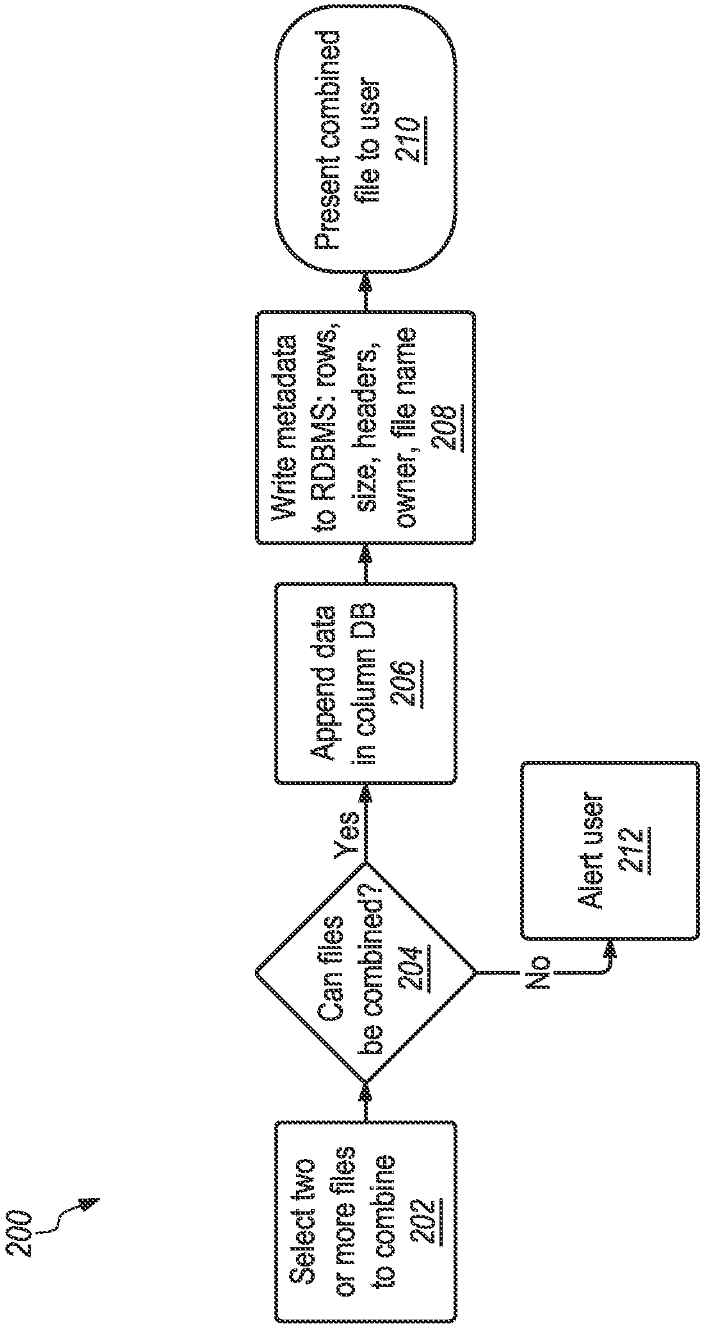
FIG. 2A illustrates an example column order and time adjustment process.

FIG. 2A illustrates an example process of combining multiple files together that could be used in one embodiment. The example program flow 200 of FIG. 2A starts execution at block 202 at which two or more files are selected. Upon receiving a request to combine two or more files, the system, at block 204, is programmed to determine whether the files can be combined by checking if file column order, column count, and corresponding data types of the two or more files are compatible with each other. If not, at block 212, a user, or a device from which the user requested the combination, is notified of the incompatibility. In an embodiment, the system may be programmed to request the user to rectify the incompatibility by modifying the column order, count, or corresponding data types of one or more of the files. Alternatively, if yes, at block 206, the system is programmed to append the data from the two or more files into a single combined file maintained by a relational database management system (RDBMS). At block 208, the system is programmed to write metadata from the two or more files to the combined file, which may include, e.g., rows, size, headers, owner, and file name. At block 210, the system is programmed to present the file to the user, or the device from which the user requested the combination.

Figure 2B:
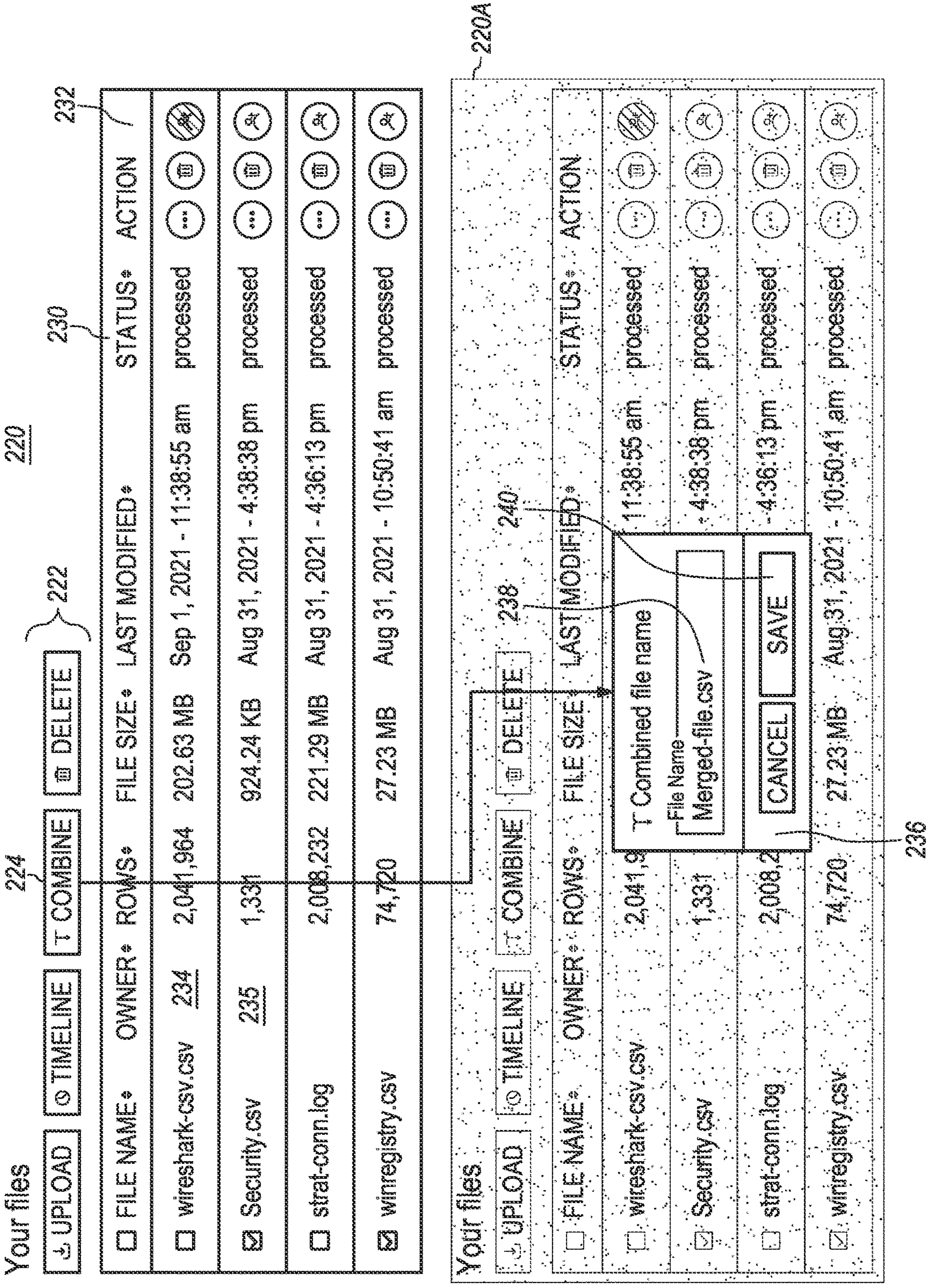
FIG. 2B illustrates an example graphical user interface that is programmed to support column matching.

FIG. 2B illustrates an example computing device with a graphical user interface (GUI) that is programmed to implement the techniques of combining files discussed above with respect to FIG. 2A. In an embodiment, the system is programmed to generate and cause displaying a graphical user interface 220 having control links or buttons 222, a file status table 230, and a combine file dialog box 236. The control links or buttons 222 can comprise graphical links or buttons to invoke specified file operations such as UPLOAD, COMBINE, DELETE or to display a TIMELINE of operations. The file status table 230 can comprise a plurality of rows 234, 235 identifying files that have been accessed, uploaded, or ingested, with columns specifying metadata for the files such as name, rows, size, modification date, and status. An action column 232 can display graphical links or buttons which, when selected, cause executing specified operations on the file identified in the corresponding row, such as deleting or sharing. In an embodiment, in response to input to select the COMBINE control link or button 224, the system is programmed to generate and display the combine file dialog box 236 with a text input field 238 and control buttons 240. To invoke the COMBINE function, checkboxes associated with one or more files in the file status table 230 must be checked. The text input field 238 is programmed to receive input specifying a name of a file in which combined data is to be saved. The system is programmed to create the named file and save the combined data in the named file in response to input to select a SAVE control button 240.

Element 220A shows how a dialog box appears over the File Status table after the user clicks COMBINE. The remainder of the user interface remains present on the visual layer below with the dialog box for the COMBINE action present on top. The user interacts with the dialog box to complete the COMBINE action and then the box closes to return to the user interface underneath.

Figure 3:
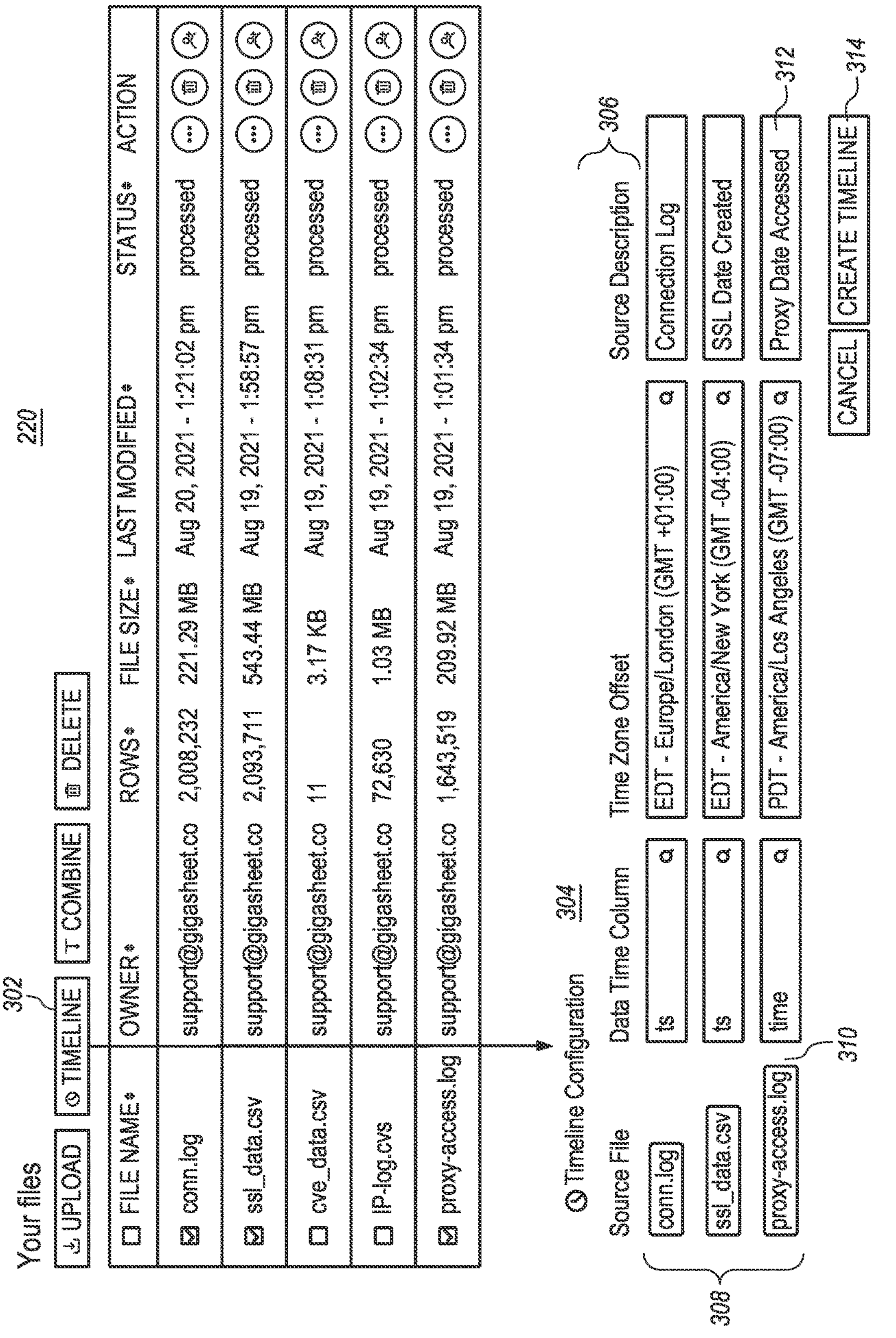
FIG. 3 illustrates an example graphical user interface that is programmed to support automatic time-based summarization.

In an embodiment, the system may be programmed to provide users a choice to transform the columns after parsing is complete in order to simplify their analysis. One example transformation is to combine multiple verbose columns in multiple different files, for example, multiple descriptions of the event into a single summary column. In an embodiment, such as the one shown in FIG. 3, a Graphical User Interface (GUI) programmed to implement automatic time-based summarization of multiple files may include a timeline button 302 that, if selected, provides a timeline configuration interface 304 of two or more files selected by a user. In an embodiment, the automatic time-based summarization may standardize timestamps across multiple files (e.g., by converting to UTC) and combine the remaining columns within each dataset into a single summary column. In an embodiment, a timeline configuration interface 304 may include the files 308 selected by a user (e.g., proxy-access.log 310), time format, time zone offset, and source description 306 (e.g., proxy date accessed 312), which a user may review and subsequently create a timeline by selecting the create timeline button 314.

Raw artifact datasets having different column headings and data types will be difficult to review in one timeline. As a solution, according to one embodiment, the networking data analysis system interface shown in FIG. 3 supports automatic summarization of the different files in one operation.

Each of FIG. 4A, FIG. 4B, FIG. 4C, FIG. 4D illustrates an example of logs from different systems with different formats and headings that may be combined based on the automatic time-based summarization discussed above. Referring first to FIG. 4A, a parsed log 402 from a file system may comprise a plurality of file records 404, 406 each having a plurality of columns 408 specifying a creation date, modification date, file name, file path, file size, file hash value, attributes, and deleted flag. In FIG. 4B, an event log 410 may comprise a plurality of event records 412 each having columns 414 that specify an event time, event identifier, event message, category, user, system. In FIG. 4C, a log 420 of registry data may comprise rows 422 having columns 424 that specify a timestamp of key modification, a registry key path, a key name, a value name, value text, and type.

In some cases, analysis may be easier when only selected columns are combined. In an embodiment, the networking data analysis system is programmed to execute a function for string concatenation to conduct concatenation of columns. For example, as shown in FIG. 4D, a concatenated log file 430 may comprise rows 432 organized with columns 434. The system may be programmed to produce a Summary column comprising data that is summarized from non-date time columns by concatenating values from each entry, with successive data items separated by a pipe character (I). Columns 434 may comprise a timestamp of the summarized data and the type of event associated with the timestamp.

Figure 5:
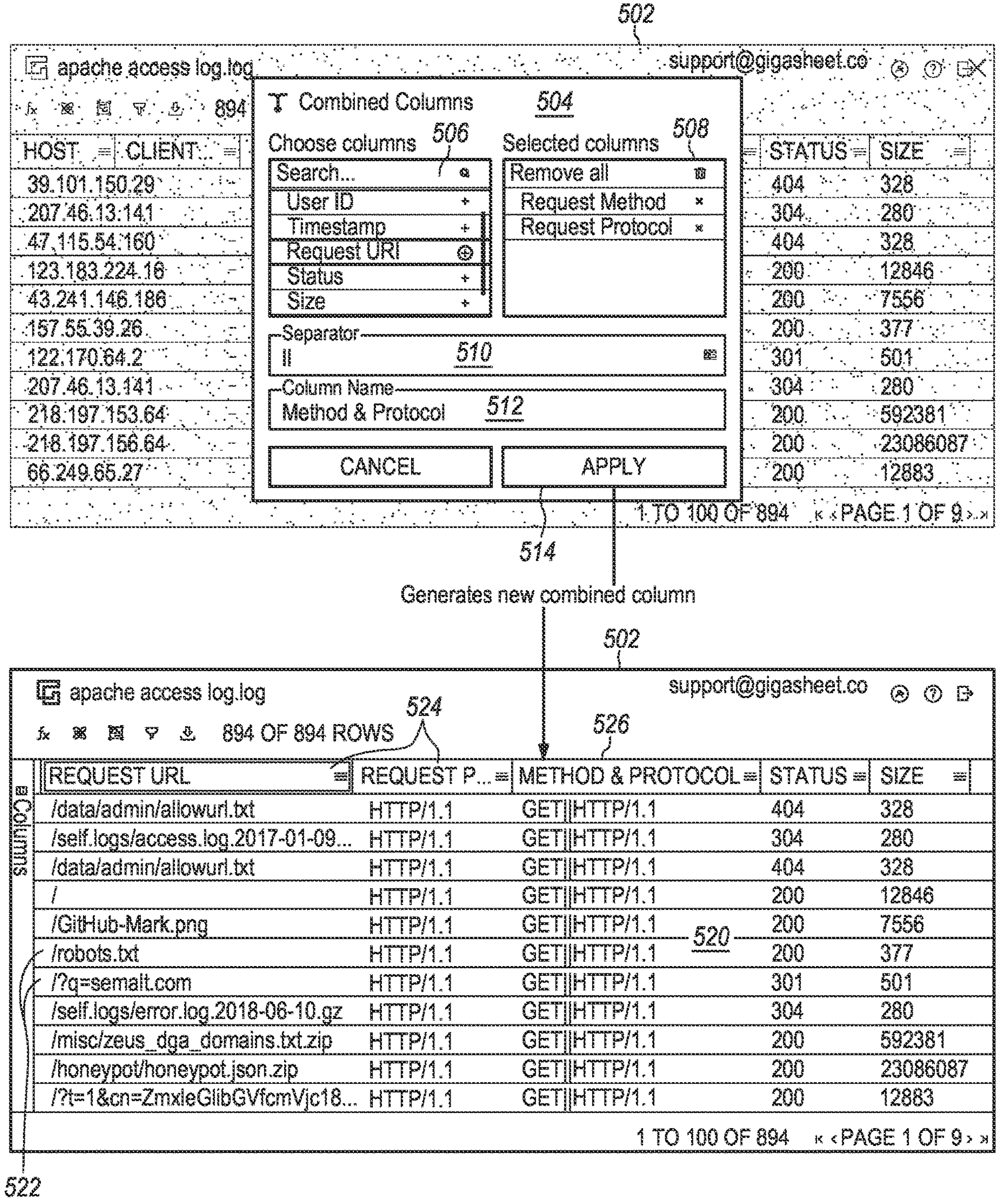
FIG. 5 illustrates an example process of combining columns.

FIG. 5 illustrates an example process of combining columns that could be used in one embodiment. FIG. 5 is structured as a two-part, before-and-after diagram showing a first example interface 502 in a top portion of FIG. 5 and a second example of the same interface 502 after applying certain data and commands.

Referring first to the top portion of FIG. 5, The system can be programmed to generate and cause displaying an interface 502 that is configured to receive input in a CHOOSE COLUMNS widget 506 to select the columns to combine. Selected columns are shown in box 508. Input to specify a separator between the column entries is provided via box 510. Input to name the new combined column is provided in a text box 512.

If the user selects a control button 514 such as APPLY, the system is programmed to generate the new combined column 526, as shown in the bottom portion of FIG. 5, as part of a graphical data table 520 having rows 522. Each row 522 may comprise data organized using a plurality of different columns or attributes 524 including the new column 526.

4. Advanced Data Filters

Traditional systems such as Excel and other spreadsheet applications were designed for finance and adapted for general broad business use and were not intended to replace a database. In contrast, in an embodiment, the disclosed networking data analysis system is designed and built for security data and has a high performance scalable database backend. It includes the ability to query, or filter for data types specific to security (e.g., IP addresses, URLs, file hashes, and etc.) by maintaining a one-to-one correspondence between a visual row in the spreadsheet and a represented row in the database.

Figure 6:
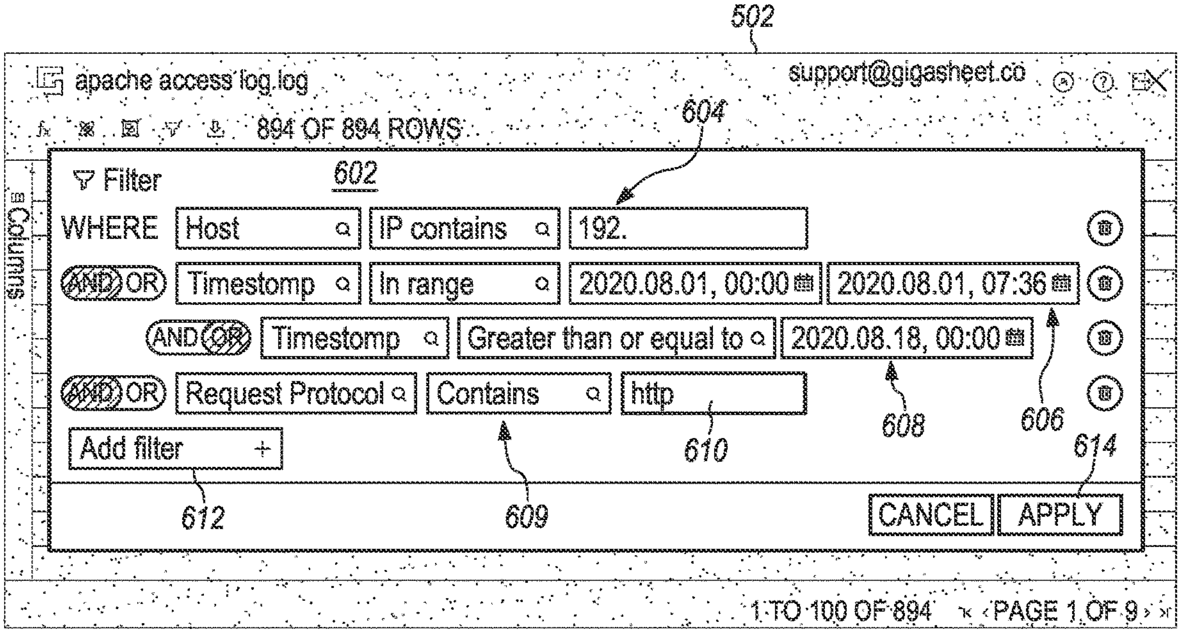
FIG. 6 illustrates an example graphical user interface that is programmed to support a visual query builder.

In an embodiment, the disclosed networking data analysis system allows users to build complex filters on the data without requiring the users to first learn structured query language (SQL) or other proprietary code. FIG. 6 illustrates an example GUI Implementation of a visual query builder. In the example of FIG. 6, the networking data analysis system may programmatically provide a graphical user interface 502 with a visual query builder 602, which is a highly customizable interface with select boxes, autocomplete functions, sliders, and date pickers. In one example, query builder 602 comprises a query 604 that has been defined using a set of data selection condition values, each programmed as a text input widget or pull-down menu. Query 604 can include multiple attributes (HOST, TIMESTAMP, REQUEST PROTOCOL, for example), operators 609, and target values 606, 608, 610. In an embodiment, an ADD FILTER control 612 can be implemented as a hyperlink or graphical button which, when selected, causes instantiating an additional filter comprising a combination of another attribute, operator, and target value. Once one or more filters are defined, they can be saved in memory or database records and, in response to selecting an APPLY control 614, executed against a dataset. The execution of this example GUI translates the selections from the query builder into corresponding SQL statements that are issued to the backend database.

Figure 7:
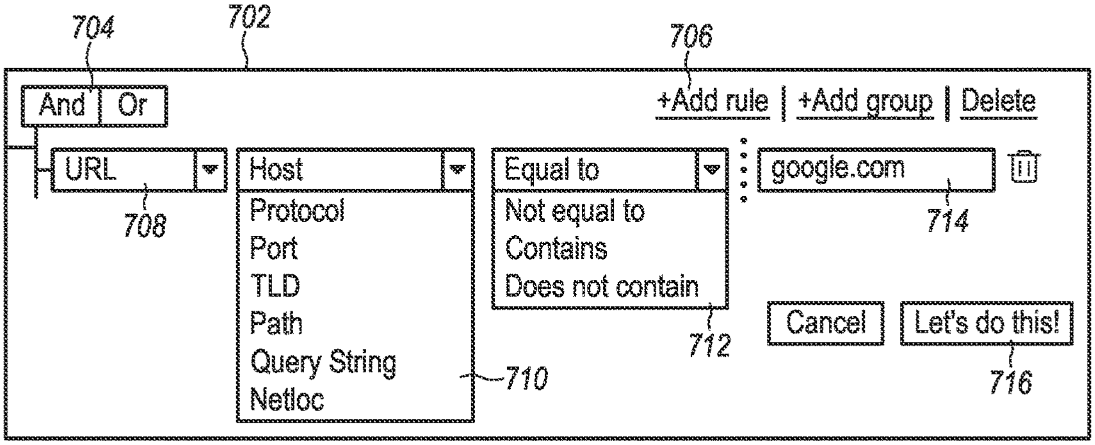
FIG. 7 illustrates an example graphical user interface that is programmed to support filtering based on URL attributes.

In an embodiment, the query builder input controls are presented dynamically based on the data types of the columns. FIG. 7 illustrates an example GUI Implementation of filtering based on URL values. The system can be programmed to generate and cause displaying a graphical user interface panel 702 with which multiple filters can be combined based on Boolean widget 704, which accepts input to specify AND or OR values, and filter widgets 708, 710, 712, 714 by which filter details can be specified. In the example of FIG. 7, filter widget 708 is a pull-down menu that has received input to select URL, but other options may be available based on columns in the dataset, such as Amount (FIG. 8) or Date Time (FIG. 9A, FIG. 9B) and the panel 702, 802, 902 is dynamically updated in response to a selection via filter widget 708. If URL is selected, then the system is programmed to display an attribute pull-down widget 710; in FIG. 7, input has specified HOST. An operator pull-down menu 712 can specify a relationship operator for comparing the URL to a value entered in text box widget 714. Input to select a control button 716 causes applying the filter to the data.

The example of FIG. 7 illustrates specifying input to create a single filter; others can be added by select an ADD RULE link or button 706 and, in response, the system is programmed to generate a second or subsequent instantiation of elements 708, 710, 712, 714 to receive input for a second or subsequent filter or rule. In an embodiment, the system is programmed to process URL structures natively and responds to queries for domain, port, protocol, top level domain, and netloc which are typically substrings of a complete URL string (as defined in Request for Comments (RFC) 1808).

Figure 8:
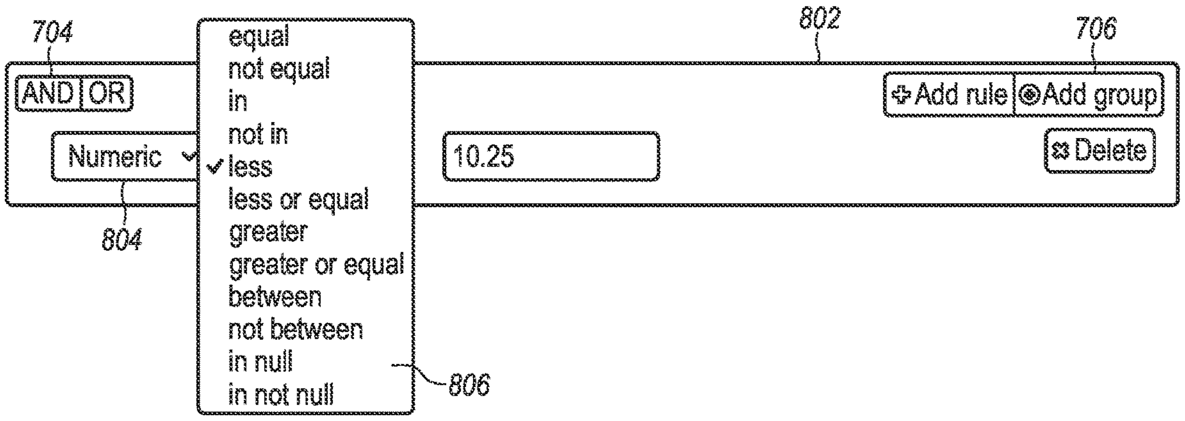
FIG. 8 illustrates an example graphical user interface that is programmed to support filter options for numeric data.

FIG. 8 illustrates the filter options presented for numeric values. For example, the system may be programmed to generate and display an interface 802 with which multiple filters can be combined based on Boolean widget 704, which accepts input to specify AND or OR values, and filter widgets 804, 806 by which filter details can be specified (e.g., AMOUNT selected via widget 804 as equal via widget 806 to an input amount value, not equal to [input], in to [input], not in to [input], less than [input], less or equal to [input], greater than [input], greater or equal to [input], between [input A and input B], not between [input A and input B], is null, is nor null). The example of FIG. 8 illustrates specifying input to create a single filter; others can be added by select an ADD RULE link or button and, in response, the system is programmed to generate a second or subsequent instantiation of elements 704, 804, 806 to receive input for a second or subsequent filter or rule.

Figure 9A:
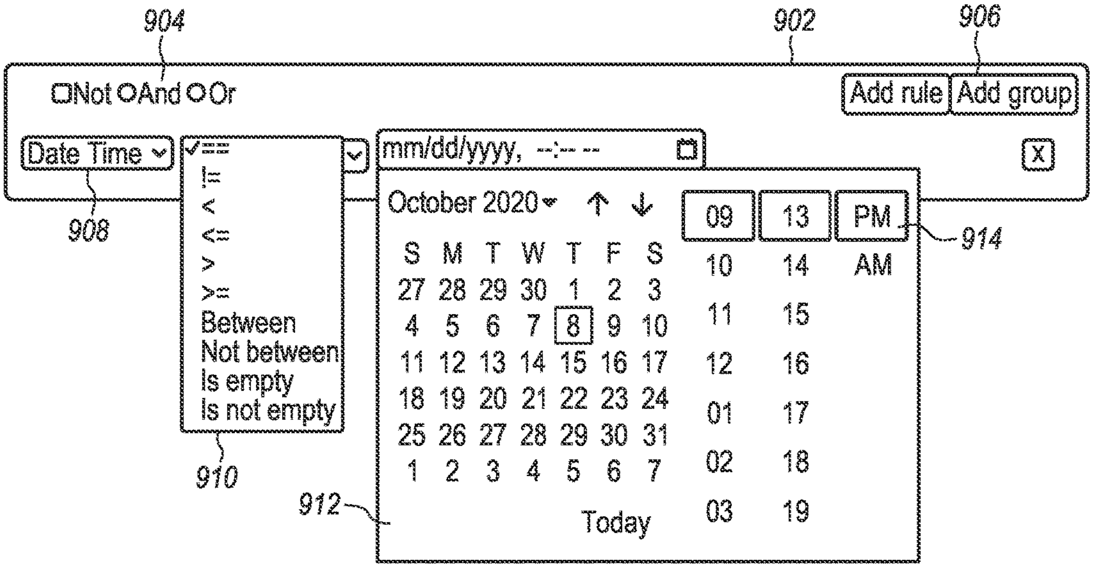
FIG. 9A, FIG. 9B illustrates an example graphical user interface that is programmed to support filter options for date values.
Figure 9B:
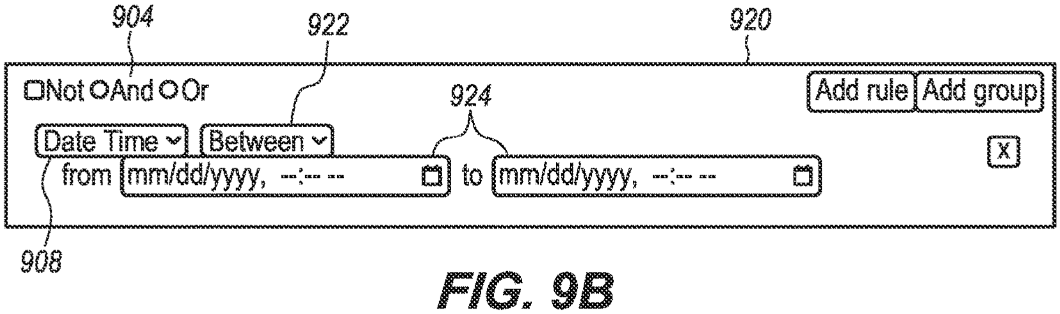

Each of FIG. 9A, FIG. 9B similarly illustrates the filters options but for date values. Referring first to FIG. 9A, in an embodiment, the system may be programmed to generate a numeric filter interface 902 having Boolean radio buttons 904, ADD hyperlinks or buttons 906, data type pull-down menu 908, comparator menu 910, and date picker 912. In an embodiment, a first filter can be defined via input specifying a data type pull-down menu 908, such as DATE/TIME, specifying a comparator using comparator menu 910, such as LESS THAN, and selecting a calendar day date picker 912. Optionally, a time may be specified via input to a time element 914. To define a second or subsequent numeric filter, a user computer may provide input to select an ADD RULE button or hyperlink at element 906. Input to Boolean radio buttons 904 specifies a Boolean operator with which to combine the second or subsequent numeric filter with the first rule or filter.

FIG. 9B illustrates the interface of FIG. 9A in which input to comparator menu 910 has specified a BETWEEN value. In response, the system is programmed to dynamically update the interface of FIG. 9A to include two date picker elements 924. A range of dates for use in a BETWEEN filter operation can be specified via user input to select each of the date picker elements 924 and select a date and/or time in the manner shown in FIG. 9A for date picker 912.

Figure 10:
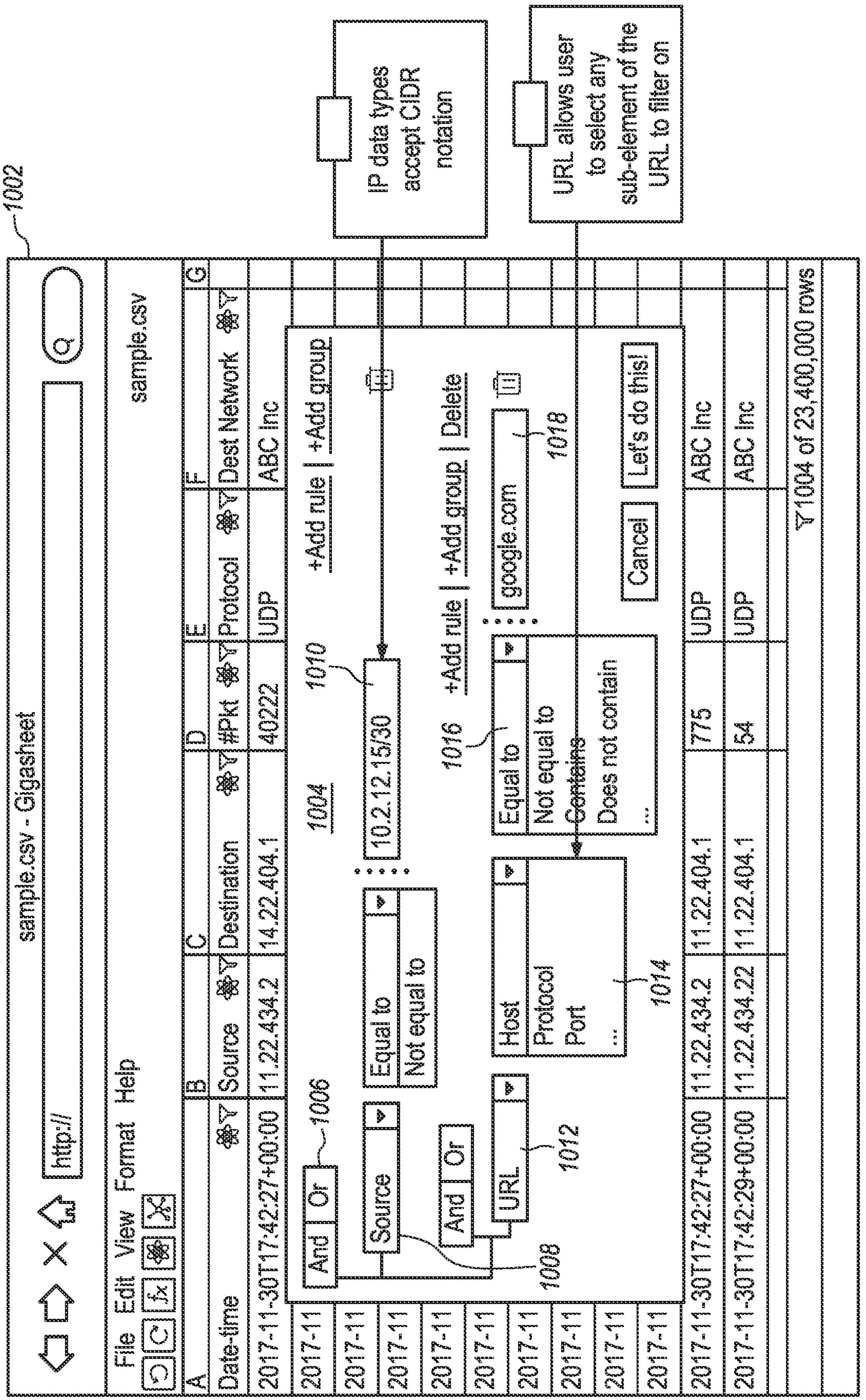
FIG. 10 illustrates an example of a computer display device displaying a graphical user interface programmed with a visual query builder.

In an embodiment, the system may programmatically provide an intuitive exploratory data analysis capability to analysts while hiding the implementation complexity from them. For example, a visual query builder may generate a structured query (e.g., SQL or JSON) that is issued to the backend database, and the front end table may be updated to display the first 100 lines of the results (or a page of the user's choosing). FIG. 10 illustrates an example of a computer display device displaying a graphical user interface programmed with a visual query builder. In an embodiment, a graphical user interface 1002 has been generated and rendered using a computer display device and includes a query interface 1004. A Boolean widget 1006 is programmed to receive input selecting whether to combine other terms, such as a data item that is specified using data item pull-down menus 1008, 1012, using a specified Boolean operator. In the example of FIG. 10, the pull-down menus 1008, 1012 have received input to select SOURCE as one data item and URL as a second data item.

As an example, FIG. 10 depicts an IP query input where Classless Inter-Domain Routing (CIDR) notation is supported, and further filtering based on protocol. An address input field 1010 is programmed to accept input for an internet protocol (IP) address value in CIDR notation, and the system disclosed herein is specifically programmed to internally manipulate data values in spreadsheet cells correctly when IP addresses are specified in CIDR format. The data item of pull-down menu 1012 may be associated with a device attribute using a further pull-down widget 1014 which is set, in the example of FIG. 10, to HOST from among a plurality of menu items such as HOST, PROTOCOL, PORT. The values specified at menus 1012, 1014 may be subject to a comparative operator specified in operator pull-down menu 1016 via input to select an operator such as EQUAL TO, NOT EQUAL TO, CONTAINS, DOES NOT CONTAIN. An target value field 1018 may receive input specifying a domain, IP address, or other internetworking value. Thus, the system is programmed such that when "URL" is selected at pull-down menu 1012, input can specify any sub-element of the URL to filter on. In addition, the user may optionally export the result set to a CSV or other standard file format.

In the case of aggregation queries, the networking data analysis system can be programmed to execute complex analytics that include additional operations (e.g. MapReduce) that go beyond simple aggregates.

In an embodiment, the system may provide an optional interface to provide ANSI SQL queries, where advanced users can input SQL directly.

The networking data analysis system, according to one embodiment, allows analysts to make use of the expressive power of SQL databases at large scale, without requiring them to have the specialized knowledge of how to write SQL queries. One example of this is by leveraging the SQL "group by" clause to quickly understand the constituents in a column of data.

In an embodiment, using a graphical user interface, an analyst can specify a column to use as a "group by" using an intuitive visual interface. The networking data analysis system may translate the user's commands on the visual interface into the SQL machine command required to group millions or billions of datasets on the specified column and then render the result to the user in the user interface. This enables rapid interactive interrogation of the data by the analyst without requiring any specialized knowledge of SQL.

Figure 12:
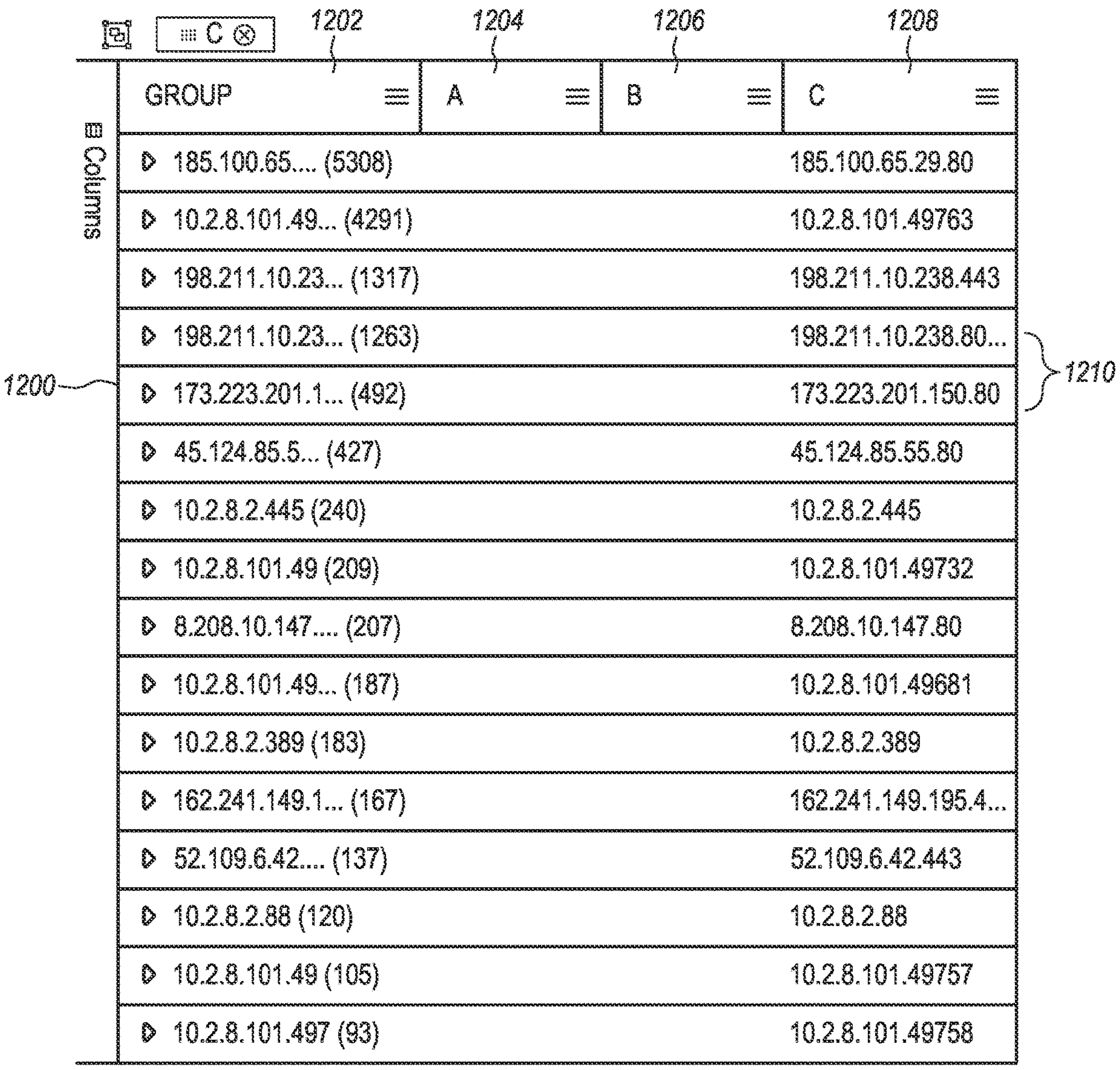
FIG. 12 illustrates an example GUI implementation of a group-by technique with column C showing group parent values.
Figure 13:
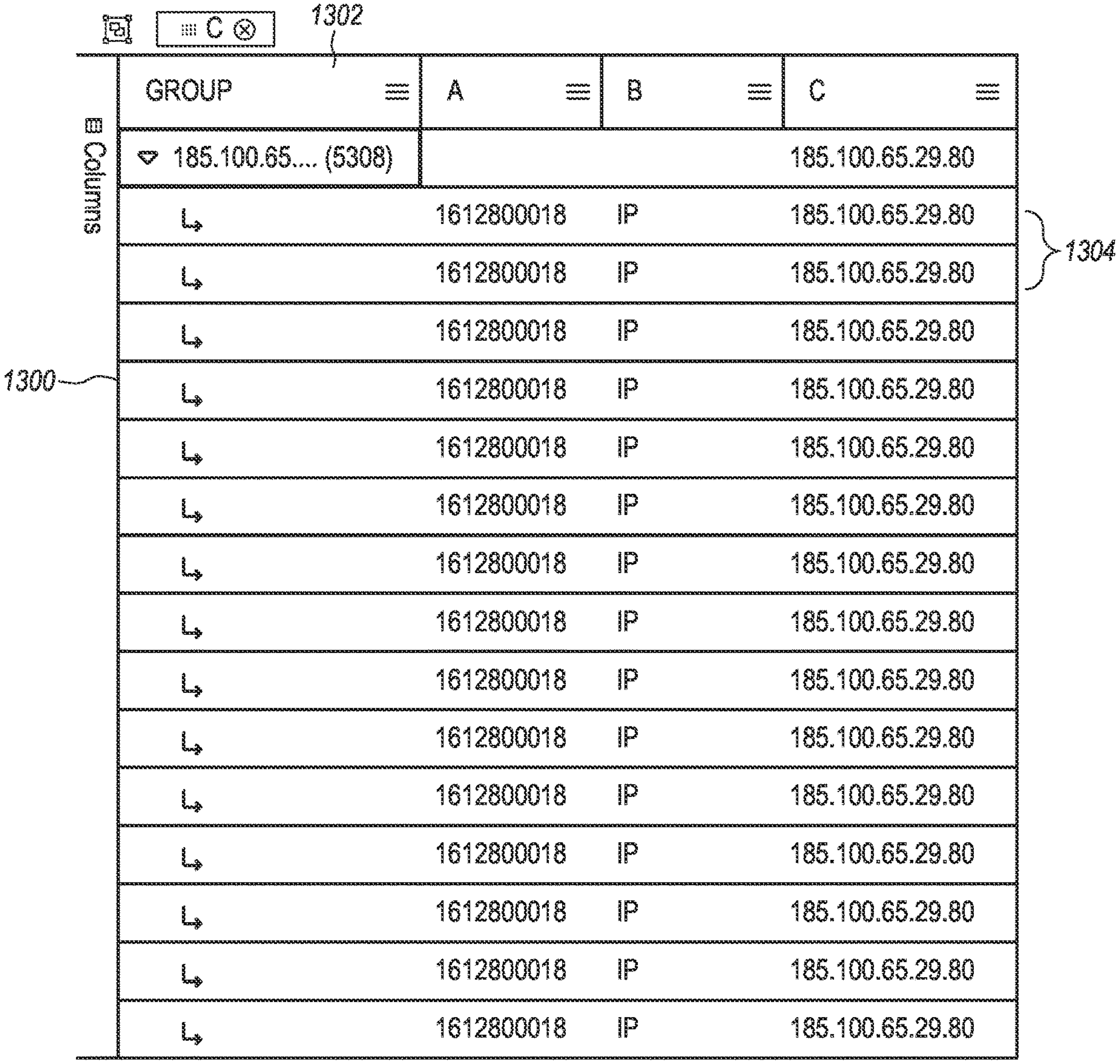
FIG. 13 illustrates an example GUI implementation of a group-by technique with column C showing parent and all children of first group

Example implementations of this technique in a graphical user interface is shown in FIG. 11, FIG. 12, FIG. 13. These operations can be done on datasets comprising millions or billions of rows through the networking data analysis system. FIG. 11 illustrates an example GUI implementation of a first group-by technique. In an embodiment, the system can be programmed to generate a group table 1100 having a plurality of rows 1108 in which all data for a specified key value in column 1102 is shown in other columns 1104, 1106. For example, column 1102 shows only the value "1612799899", indicating that all rows having that value have been grouped, while columns 1104, 1106 show data type values ("IP") and corresponding address values in CIDR format.

FIG. 12 illustrates an example GUI implementation of a second group-by technique showing group parent values. In an embodiment, the system is programmed to generate a group table 1200 having a plurality of rows 1210, each row having a column 1202 that identifies a group, columns 1204, 1206 for other data values associated with the group, and a group parent value column 1208 showing a group identifier for a parent group associated with the group identified in the row.

FIG. 13 illustrates an example GUI implementation of a third group-by technique showing a parent and all children of a first group. In an embodiment, the system is programmed to generate a group table 1300 having a parent group element 1302 that identifies a parent group, and a plurality of rows 1304 that specify child groups having a parent-child hierarchical relationship to the parent group. For each child group, column C identifies the child group and columns A, B show other values relevant to the child group.

5. Automatic Threat Detection

One of the common goals for threat analysts is to determine whether there are indications of threats. The networking data analysis system, according to one embodiment, accelerates this using the procedure 1400 shown in FIG. 14. In this diagram, the system has already processed one or more input files as described above. In an embodiment, the Automatic Threat Detection component of the system may programmatically and automatically run on new files and/or on a periodic basis on files that were already seen. The Automatic Threat Detection component of the system may use a collection of different techniques to identify specific data elements in the user uploads that may indicate a potential threat. The results of those techniques may be added into the datasets containing data from the analyst such that the analyst is able to see the results visually.

Figure 14:
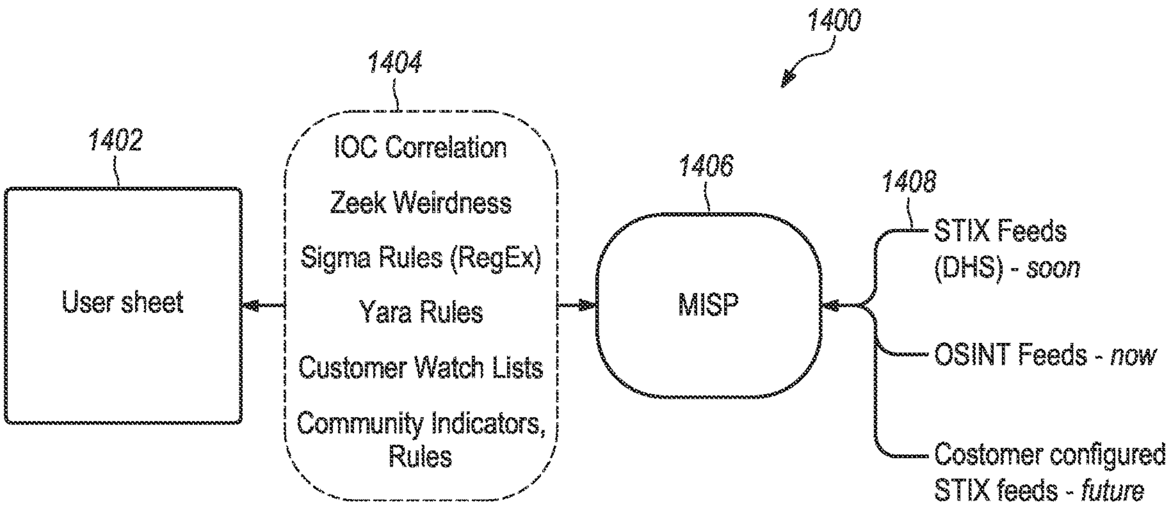
FIG. 14 illustrates an example process of an automatic threat detection technique.

In an embodiment, the automatic threat detection techniques are applied to specific data elements in the data from the analyst, for example, the user sheet 1402 illustrated in FIG. 14. Examples of the specific data elements in the user sheet 1402 may include IP address, hash value, internet domain name, and internet Uniform Resource Locator (URL). In an embodiment, the automatic threat detection techniques may involve determining the number of times a particular IP address identified as suspicious by the security community appears in a set of lists of IPs identified from the data, and the number of times that particular IP address appears in the data. Other techniques include, as shown in box 1404 in FIG. 14, implementation of a set of detectors in the Zeek project, implementation Sigma rules, implementation Yara rules, checking the specific data elements against user-provided lists, or checking against Application Programming Interfaces (APIs) provided by third-parties that work on security applications.

In an embodiment, the automatic threat detection techniques will interact with a Malware Information Sharing Platform (MISP) to execute the check. In such an embodiment, as shown in box 1406 in FIG. 14, the data inside the MISP may be populated using separate processes that run asynchronously from the data checks. The sources of the data inside the MISP include public threat feeds in STIX format, feeds the analyst chooses, or other public data sources, as shown in elements 1408 in FIG. 14.

In an embodiment, the system may automatically and periodically execute the automatic threat detection techniques across all files in the system to check for threats without having to manually execute the automatic threat detection techniques.

6. Pattern Identification

An important task for threat hunters and incident responders alike is to accurately timeline events to allow analysts to identify pre-attack or post-attack patterns of interest. Many third party systems log time in different formats and in different time zones. Event logs that are logged in different formats or different time zones may need to be adjusted to be aligned with each other. Analysts typically standardize data time data in Coordinated Universal Time (UTC) format to eliminate confusion of both time zones and time adjustments like daylight savings.

In an embodiment, the system is programmed to automatically detect time-date value fields in input files and transform the values into UTC format values, which are then stored in the back-end datastore as the native time representation in association with the original time-date value. In an embodiment, the system may be programmed with a date format toggle function which, when selected for any particular visual cell, displays either the transformed UTC value, the original time-date value, or both.

In an embodiment, the networking data analysis system, according to one embodiment, may programmatically look for host information (e.g., IP address, host name) in submitted files and automatically calculate key metrics of interest for investigations. Examples of such key metrics include summary count of unique hosts, most frequent senders and receivers, most voluminous communicators, most frequently communicating pairs, and pairs with most volume of data exchanged.

In an embodiment, the networking data analysis system may programmatically perform, for any column or group of columns, the following functions:

Count—Returns a number of occurrences of each unique value in the dataset;

Unique count—Returns a number of occurrences of each unique data element of the data elements;

Prevalence—Returns number of unique elements with the characteristic of interest divided by the total number of unique elements;

Pivot—Returns a summary of the data of a more extensive table, including sums, averages, or other statistics, which the pivot table groups together in a meaningful way;

Pair Count—Returns a number of occurrences of a pair of two unique values of the log data, the two unique values being separated in two different columns; and Pair Volume—Returns, for each unique pair of values that are in a column specified by a user, a sum of the volume values.

For example, with an example file submission shown below on the left, the networking data analysis system, according to one embodiment, may programmatically execute the above example functions and provide a pairwise pivot table shown below on the right. In the pairwise pivot table, it can be seen that three unique pair values have been identified: {10.1.1.0, 10.1.1.3}; {10.1.1.1, 12.12.12.0}; {10.1.1.2, 10.1.1.0}. The pivot table further shows the number of counts of each unique pair appears in the file submission, and the total volume value of each of the unique pairs. The networking data analysis system, according to one embodiment, may also provide that in column of A of the file submission, there are four unique values.

Pairwise Pivot

| Pair | Pair Count | Pair Total Volume |
|---|---|---|
| {10.1.1.0, 10.1.1.3} | 3 | 120 |
| {10.1.1.1, 12.12.12.0} | 1 | 240 |
| {10.1.1.2, 10.1.1.0} | 2 | 120 |

File submission

| [A] IP1 | [B] IP2 | [C] Volume |
|---|---|---|
| 10.1.1.0 | 10.1.1.3 | 10 |
| 10.1.1.1 | 12.12.12.0 | 240 |
| 10.1.1.2 | 10.1.1.0 | 100 |
| 10.1.1.3 | 10.1.1.0 | 100 |
| 10.1.1.3 | 10.1.1.0 | 10 |
| 10.1.1.0 | 10.1.1.2 | 20 |

As another example, based on the file submission shown above, networking data analysis system, according to one embodiment, may programmatically provide, upon a user request to look for IP2 (destinations) that are rare across the population of IP1 (senders), provide the following table.

| Prevalence of [B] among [A] | |
|---|---|
| IP2 | Prevalence |
| 10.1.1.3 | .25 |
| 12.12.12.0 | .25 |
| 10.1.1.0 | .50 |

As another example, based on the file submission shown above, networking data analysis system, according to one embodiment, may programmatically provide, upon a user request for calculations for only IP1s (sources), provide the following table.

| Unique Count [A] and Total Volume Pivot: | | |
|---|---|---|
| IP1 | Count | Total Volume |
| 10.1.1.0 | 2 | 30 |
| 10.1.1.1 | 1 | 240 |
| 10.1.1.2 | 2 | 100 |
| 10.1.1.3 | 2 | 110 |

As another example, based on the file submission shown above, networking data analysis system, according to one embodiment, may programmatically provide, upon a user request for calculations for IPls (sources) that have a lot of unique IP2s (destinations, provide the following table.

| [A] Count of Unique [B] | |
|---|---|
| IP1 | Count of Unique IP2 |
| 10.1.1.0 | 2 |
| 10.1.1.1 | 1 |
| 10.1.1.2 | 1 |
| 10.1.1.3 | 1 |

7. Beacon Detection

In an embodiment, the networking data analysis system incorporates algorithms to detect beaconing. These algorithms identify short and regular communications from one host to another. A host infected with malware will often communicate on a periodic basis to an external command and control system. These communications provide a signal to the attacker that the infected host is now available and is ready for further instructions. These communications can also be the exfiltration of data from the infected host.

Compromised systems often send homing signals, known as "beacons," back to command and control servers. Attackers use beacons to monitor access to compromised machines as well as to transmit instructions, data, and additional malicious code. Because beacon connections are more uniform than their human-generated counterparts, beacon analysis may be used to identify suspicious patterns caused by malicious activity on a system. The beacon detection algorithm may consider the following factors to identify suspicious patterns:

Total Score (Score). Total score (shown as score) is the average of the interval score and the data size score.

Interval Score. The score for an interval is calculated by averaging each of the interval measurements (skew, dispersion, and connection count score). Skew and Dispersion are described below. Connection count score is calculated by comparing the number of connections to the range of intervals between connections.

Data Size Score. The score for data size is calculated by averaging data size skew, dispersion, and a smallness score. Skew and Dispersion are described below Smallness score is a score based on how big the mode of data sizes is. A beacon will often be sending very small amounts of data frequently, so smaller data size mode indicates a higher likelihood of beacon activity.

Source IP. This is the IP of the system that initiated the connection.

Destination IP. This is the IP of the system that received the connection.

Connections. The connections value counts the number of times the source IP connected to the destination IP.

Average Bytes (Avg Bytes). Average Bytes is the total number of bytes sent in both response and request connections divided by the number of connections.

Interval (Intvl) vs Data Size (Size). There are two main ways beacons are looked for. One of them is by comparing the time between connections, which is referred to as interval (shown as intvl). The other is looking at the size of data being passed in each connection known as data size (shown as size). In some cases, attackers will disguise a beacon through intervals that are random enough, they might not appear to be beacons. In this case, these beacons can still be recognized because they have a consistent data size being passed. Each of the following measurements have columns for both interval and data size.

Range. Range is the difference between the largest interval or data size, and the smallest interval or data size.

Top. Top is the mode of the interval or data size values.

Top Count. Top Count is the number of times the mode of the interval or data size was seen.

Skew. Skew measures how distorted or asymmetric the data is. More symmetric data would result in a skew value closer to 100%, while more asymmetric data would result in a skew value closer to 0%. This is useful in the case of malware that does not try to disguise its beacons but is especially useful in detecting malware that has applied jitter to its beaconing. This is because jitter is typically implemented by using a random number generator to add or subtract to a mean value (e.g. 30 seconds+/−5 seconds for the interval). The random number generator will end up uniformly distributing the values, which results in the data being symmetric.

Dispersion. Dispersion describes how likely the interval is to stray from the mean. A dispersion value closer to 100% means that most values were clustered around the mean and had little variation. Typical traffic will have large variation in both the intervals between connections and the amount of data passed during the connection. In the case of obvious beacons, time intervals, and/or data size tend to be clustered around one value. This is only useful in the case of beacons that were not designed to be hard to find. The more jitter there is, the less useful dispersion is.

8. K-Means Clustering

In an embodiment, the networking data analysis system incorporates K-means clustering algorithm for partitioning a data table into subsets (clusters), in such a way that the members of each cluster are relatively similar. This can be helpful to group hosts that exhibit normal behavior, and those that do not. In an embodiment, a user may select the variables (column names) to be included in the analysis.

The clustering is initialized using data centroid based search, using unit weights, and correlation or Euclidean distance as the distance measure. In an embodiment, the clustering is performed on filtered rows. If the user wishes all rows to be included in the clustering, they need to reset all filters prior to clustering. The columns utilized by the clustering operation are specified by the user, as are the desired number of clusters (k).

8. Anomaly Detection

In an embodiment, the networking data analysis system, according to one embodiment, is programmed to use a collection of different techniques to identify specific data elements in the user uploads that may indicate a potential threat to a domain, network infrastructure element, endpoint, or other element represented in the data. The results of the techniques are added into the sheets containing data from the analyst and the analyst is able to see the results visually. An example of anomaly detection that can be programmed in the system is shown at the time of this writing in the file path "/lytics/anomalyzer" of the domain "github.com" on the internet. In an embodiment, the networking data analysis system, according to one embodiment, allows users to visualize this information with familiar charts (e.g., bar, line, pie charts) and also offers interactive network graph visualizations not commonly available in spreadsheets or BI tools.

Figure 15:
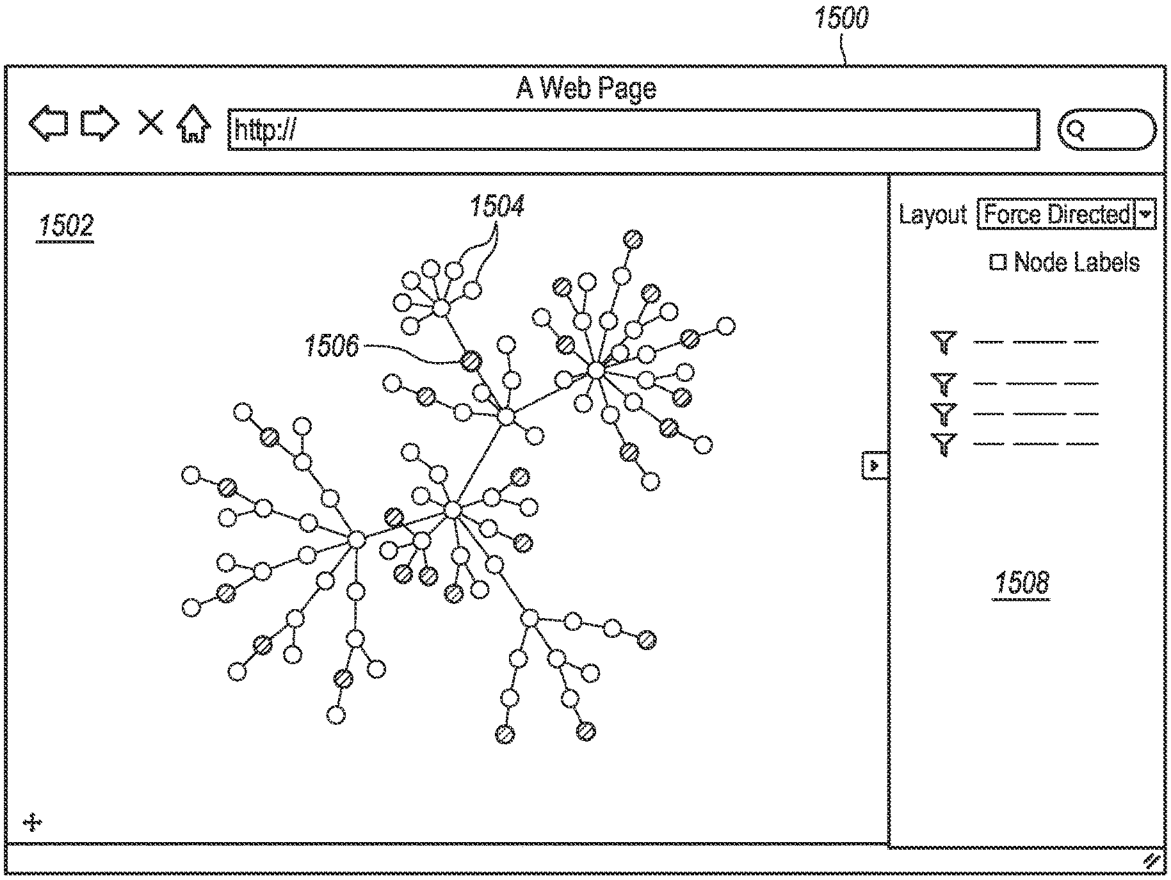
FIG. 15 illustrates an example of an interactive visualization of a network graph.

FIG. 15 illustrates an example of an interactive visualization of a network graph. In one embodiment, the system is programmed to generate a graphical user interface 1500 for a computer display device comprising a graph panel 1502 that displays a graph having a plurality of leaf nodes 1504 representing network endpoints joined by edges to intermediate nodes 1506 representing network infrastructure gear. A display modification panel 1508 may comprise interactive graphical controls which, when selected, cause applying changes in layout arrangement, node label displays, or filtering of one or more nodes. The system selects the optimal layout algorithm to best display the data.

9. Automated Enrichment

Threat hunters and incident responders often enrich artifacts with threat intelligence from third-party sources. Threat intelligence helps analysts identify false positives, add context to their data, and allows them to compare internal and external sources. Using third party threat intelligence, analysts can quickly identify indicators or patterns that are likely innocuous rather than malicious.

Correlating third-party threat intelligence with internal data is often done within a SIEM, but the enrichment is often limited in size and scope to allow for optimal processing of real-time events. Enrichment in a spreadsheet is possible but is an arduous process that requires extensive custom formulas and knowledge. Because of this high friction, organizations may resort to using a third party solution, e.g., Threat Intelligence Platform (TIP), which further increases costs and requires additional resources.

In an embodiment, the networking data analysis system is programmed to respond to input specifying enrichment of datasets by fetching threat intelligence from third-party API services, or from a hosted cache of feeds and enrichments. For example, the system can be programmed to transmit programmatic calls to APIs, or parameterized URLs, to third-party networked servers that provide feeds that identify new threats and to create and store records in an in-memory cache or database cache to record IP addresses, domains, or other identification of potential threats. Enrichment data can include values identifying a third-party source of threat intelligence, the nature of the threat, remediation options, time of discovery, or other information that the third-party sources provide for threats; "enrichment" refers to adding this data to existing data that the system has already stored. In contrast to SIEMs, spreadsheets, and TIPs, the automated enrichment techniques disclosed herein do not require extensive configuration and set up. Instead, an intuitive user interface allows users to enrich their data sets by requesting threat intelligence on-demand without having to write code or understand how APIs function. An example of such an interface is illustrated in FIG. 16.

Figure 16:
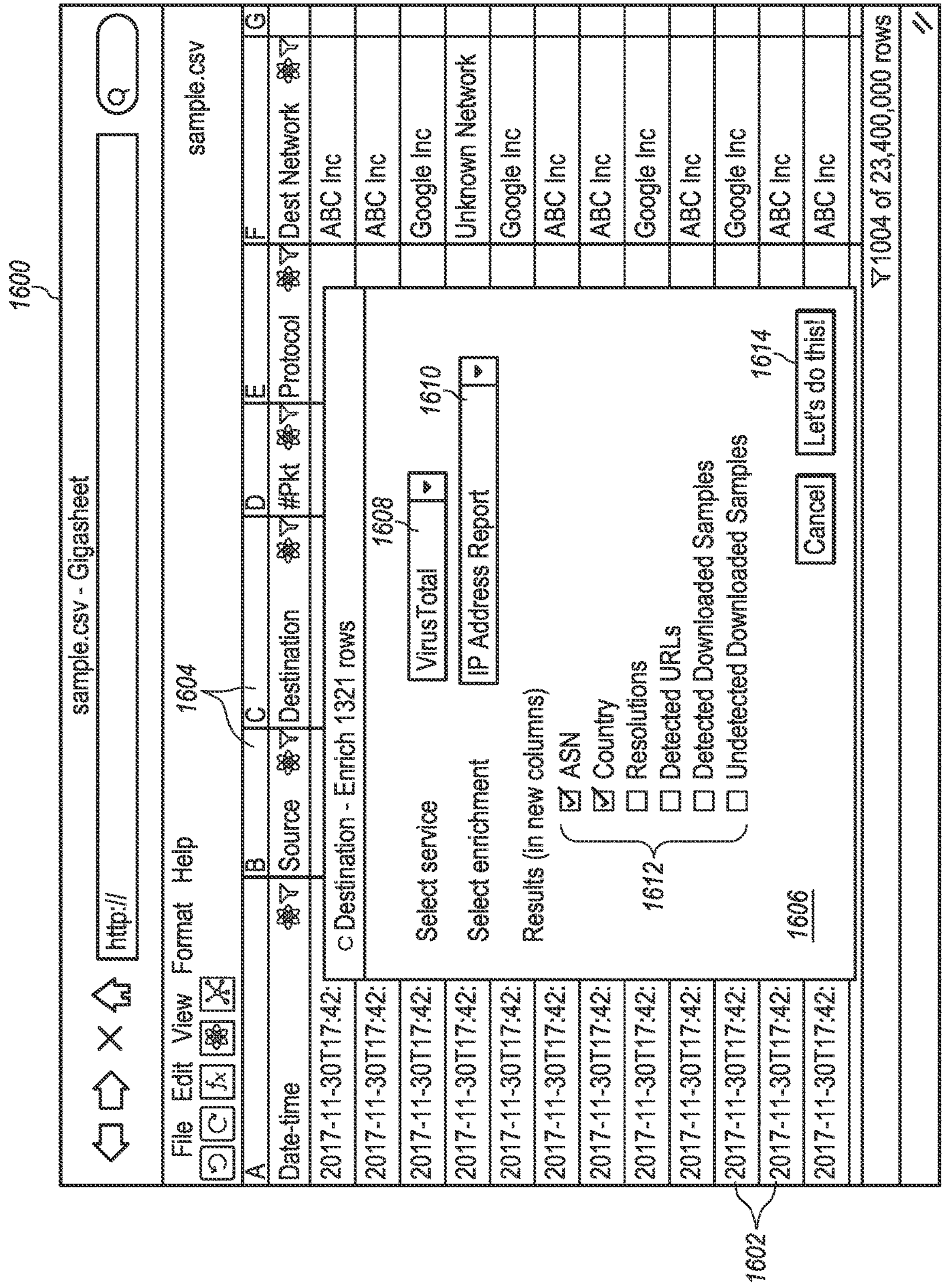
FIG. 16 illustrates an example GUI implementation of an automated enrichment process.

Referring to FIG. 16, to enrich data in the networking data analysis system, a user may click on the atom icon for a column for which they wish to get more information (e.g., element 1604). In the example shown in FIG. 16, a user has selected the Destination column which contains IP addresses. The popup interface 1606 allows the user to select a service from a list of third party enrichment services (e.g., VirusTotal 1608) and an enrichment from a list of enrichments offered by the service (e.g., IP address Report 1610). The user is further able to select what columns the output table should include (e.g., ASN and Country 1612). After selecting the parameters discussed above, if a user selects the Let's do this button 1614, the system constructs an API request to the third party system. An example API request may look like this: https://www.virustotal.com/vtapi/v2/url/report?apikey=<apikey>&resource=<resource>, where <apikey> is replaced with the user's token and <resource> is replaced with the IP address from the Destination column 1604. Then, the system iterates through each of the currently filtered Destination IP addresses and transmits the corresponding API request to the corresponding service using the user's API token. Then, the API responses are parsed, and the elements selected by the user (ASN and Country) are added to the table as new columns. For example, an API response from the VirusTotal service for a given IP can be:

```
{
  'response_code': 1,
  'verbose_msg': 'IP address found in dataset',
  'asn': '25532',
  'country': 'RU',
  'resolutions': [{
   'last_resolved': '2013-04-08 00:00:00',
   'hostname': '027.ru'
  }, {
   'last_resolved': '2013-04-08 00:00:00',
   'hostname': 'auto.rema-tiptop.ru'
  }, {
   'last_resolved': '2013-04-08 00:00:00',
  'hostname': 'catalog24de.ru'
  }, {
   'last_resolved': '2013-04-08 00:00:00',
   'hostname': 'club.velhod.ru'
  }, {
```

-continued

'last_resolved': '2013-04-08 00:00:00',
'hostname': 'danilova.pro'
}],
'detected_urls': [{
'url': 'http://027.ru/',
'positives': 2,
'total': 37,
'scan_date': '2013-04-07 07:18:09'
}],
'detected_downloaded_samples': [{
'date': '2018-03-29 18:38:05',
'positives': 2,
'total': 59,
'sha256':
'd9cacb75a3fd126762f348d00fb6e3809ede2c13b2ad251831e130bcb7ae7a84'
}, {
'date': '2018-03-29 08:52:38',
'positives': 2,
'total': 59,
'sha256':
'416751ebbd5d6c37bb20233a39ade80db584057f3d5c4bbf976ce9c332836707'
}],
'undetected_downloaded_samples': [{
'date': '2018-03-28 06:36:55',
'positives': 0,
'total': 0,
'sha256': '4a91398fd21f2d0b09fc7478d016d4a8fc9fe6f1c01e10b8e7c725542260cd9f'
}, ],
'undetected_urls': [
[
'http://zadiplomom.ru/',
'3aafd5a54bb034882b8f5544bb647b6841bcb6ce938c40fb92be4cb84f2f0983',
0,
67,
'2018-02-19 18:04:15'
],
}
}

The system can be programmed to parse the API from the VirusTotal service, to cause loading the value "25532" into a new column titled VirusTotal_ASN and loading the value "RU" into a new column titled VirusTotal Country.

Most enrichment services follow the same construct: assemble a URL which contains the user token, the element to be enriched, parameters specifying the enrichment details requested. In an embodiment, the networking data analysis system, according to one embodiment, may generate and/or maintain templates for popular enrichment services. In an embodiment, users may also specify a template for enrichment from other services, if the template follows the same REST-style construct.

Figure 17:
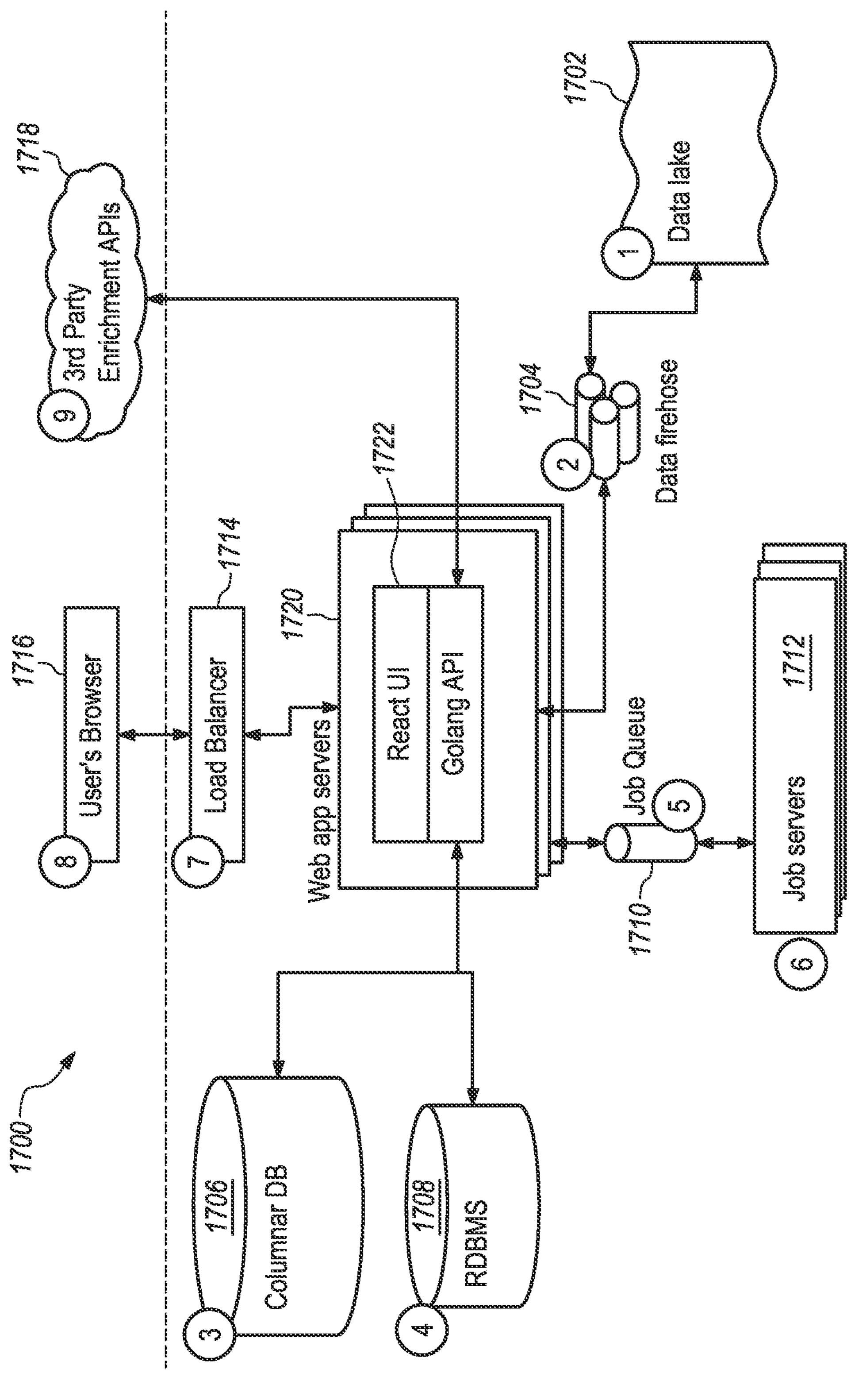
FIG. 17 illustrates an example distributed computer system showing data flows between functional elements of the distributed system.

In an embodiment, when a user requests an enrichment (e.g., by clicking the Let's Do This box 1614), the networking data analysis system is programmed to add a data processing task to a job queue, such as job queue 1710 of FIG. 17, which is described further in other sections herein. Upon execution of this step, the networking data analysis system is programmed to asynchronously make API calls for additional metadata on the selected rows. The results of these API calls may then be merged with the underlying database table and visually displayed to the end user via the UI.

10. Data Enrichments for Analyzing Space and Time

In addition to traditional data enrichment techniques (e.g. looking for presence of an IPv4 address on a list of suspected spammers or malicious actors), the networking data analysis system, according to one embodiment, implements additional innovative, third-party, data enrichments techniques that are not currently available with existing SEIM tools, such as:

Geohash—an approximate activity location on the Earth, depicted as a bounded rectangle or "box" on the ground represented by a unique ASCII string (additional details available at https://en.wikipedia.org/wiki/Geohash);

Timehash—a window of time represented by a unique ASCII string (additional details available at [https://github.com/abeusher/timehash)

Geotemporal hash—a combination of geohash and timehash that represents a geospatial region of the Earth during an interval of time, represented as a unique ASCII string (additional details available at https://www.researchgate.net/publication/320522566_DETECTION_OF_BEHAVIOR_PATTE RNS_OF_INTEREST_USING_BIG_DATA_WHICH_HAVE_SPATIAL_AND _TEMPORAL_ATTRIBUTES The above hashing techniques provide a mechanism for "binning" or clustering records together based on their approximate similarity in physical space or time. They also provide new analytic primitives for identifying adversary activity at a higher level of abstraction, greatly simplifying the process of Threat Hunting.

11. Hunting Guides

Hunting Guides are an artificial intelligence expert system that emulates the decision-making ability of expert security analysts. Hunting Guides automate a series of explicit rules in a decision tree to help users automate routine tasks, as well as capture and share industry best practices. The networking data analysis system, according to one embodiment, is programmed to offer a set of Hunting Guides, but users may contribute their own workflows. In an embodiment, the networking data analysis system, according to one embodiment, utilizes user Machine Learning to aid knowledge acquisition for Hunting Guides. User interaction data helps automate the process of designing, honing and maintaining rules defined by experts.

In an embodiment, users may build their own Hunting Guides using a standard format (e.g., using Jupyter notebooks), but some basic guides may still be built in the system. An example of a Hunting Guide that calculate metrics for IP network communications is shown below.

IF file submission contains 2 IP columns
  THEN prompt the user to specify the Volume column
  AND assign [A] as the first IP, [B] as the second IP, and [C] as the Volume
  AND calculate METRICS
ELSE IF file submission contains IP column and 1 URL column
  THEN prompt the user to specify the Volume column
  AND assign [A] as the IP, and [B] as the root domain of the URL
  AND calculate METRICS
METRICS are composed of the following:
Unique count of [A]
Unique count of [B]
Pairwise Pivot (as defined above)
Unique Count [A] and Total Volume [C] Pivot
Unique Count [B] and Total Volume [C] Pivot
[A] Count of Unique [B]
  [B] Count of Unique [A]

An example of a Hunting Guide that correlates file hashes with the NIST National Software Reference Library (NSRL) white list is shown below.

IF file submission contains column of SHA-1 hash data type
  THEN add new column titled IN_NSRL with data type boolean
  AND FOR EACH row where SHA-1 hash appears in NSRL write IN_NSRL TRUE
  ELSE write IN_NSRL FALSE 12. System Architecture The networking data analysis system architecture is designed for speed, scale, data enrichment, analytic power, and multi-tenancy. Ingested log data may be stored in a columnar database that is optimized for rapid storage and retrieval of data sets spanning millions or billions of records. In an embodiment, the system architecture is built using the high performance "Go" programming language and features of modern cloud architecture. The networking data analysis system may be horizontally scalable as the amount of ingested data grows. The networking data analysis system, according to one embodiment, provides at least the following improvements over past approaches:

| Item | Benefit to Information Security Use Cases |
| --- | --- |
| Converting IPv4 addresses into discrete IP address ranges, e.g., using the IPbin algorithm (additional details of the IPbin algorithm is available at https://github.com/abeusher/ipbin) | IPbin algorithm is a highly efficient data encoding for IP addresses that enables (a) machine learning powered pattern detection using Gradient Boosted trees and (b) machine learning enabled anomaly detection using state of the art random cut forest (RCF). These two ML techniques do not work with raw IP addresses. |
| Conditioning IPv4 addresses with a geolocation (latitude, longitude) and normalized timestamp (epoch seconds) which are hashed using a one-way cryptographic hash algorithm to produce geohash and timehash attributes. IPv4 address's latitude and longitude are obtained via lookup in an IP Geolocation database. | This specialized data encoding (geo-temporal hashing) and indexing speeds up analytic queries related to space & time by an order of magnitude compared with traditional approaches. Additionally, this unique data encoding enables data linking of cyber events that occur at approximately the same time across multiple data sources, which is not possible with traditional SEIM products that can only correlate log events that have the exact same time. |
| Use of a column store analytic database for capturing all incoming log data, including the structured enrichments of geohash, timehash, and IPbin. | Traditional SEIM tools have limited ability to automate detection of APTs and related complex cyber-attacks; additionally, these traditional tools do not scale up to billions of records.<br>By using the derived geohash, timehash, and IPbin as new analytic primitives, the networking data analysis system can automate the identification of threat patterns extremely efficiently and scale up to data sets of hundreds of billions of records. |
| Automatic Threat Detection | Using a collection of different techniques to identify specific data elements in the user uploads that may indicate a potential threat. The results of those techniques are added into the sheets containing data from the analyst and the analyst is able to see the results visually. |

FIG. 17 illustrates example data flows between functional elements of a distributed system according to one embodiment. In the example of FIG. 17, a distributed computer system comprises a load balancer 1714 having a first connection to an internetwork and a second connection to one or more application servers 1722. The application servers 1720 may implement a REACT-based user interface 1722 and an application programming interface using GOLANG, or functional equivalents thereof. The API can be callable using programmatic calls or parameterized URLs, and can include code programmed to access third-party networked servers 1718 with APIs for purposes of collecting enrichment data. The application servers 1720 may be coupled to a columnar database 1706 and a relational database 1708 for storage of data in the manner described in other sections herein. The application servers 1720 can implement a job queue 1710 to buffer jobs or tasks for execution using one or more job servers 1712. The application servers 1720 can be coupled via a data firehose 1704 to a data lake 1702 that stores a large set of records of internetworking data including raw logs, anomaly information, or performance information. The application servers 1720 can be accessed in an interactive manner using one or more user computers executing a browser 1716 that connect through an internetwork to load balancer 1714.

As users bring data into the networking data analysis system using a secure file upload capability, the data may be securely stored in the networking data analysis system data lake 1702 via an S3 compliant file storage mechanism. The upload of a new file triggers the data firehose 1704, which may be a golang application that normalizes the incoming data and adds a number of the networking data analysis system standard enrichments including location metadata, geohash, timehash, and IPbin. These enriched records are then stored in the analytic Columnar database 1706 and metadata about the records and access control metadata are stored in the standard relational database 1708. Data from the Columnar database then becomes immediately available to authenticated users through their web browser 1716 which is connected to the networking data analysis system web application through a load balancer 1714.

As users interact with the networking data analysis system, they may choose to add additional third party data enrichments to their data through the application UI. For example, a user may decide to enrich their web proxy logs with an external service to look for known bad URLs (Virus Total API). This enrichment request is put into the networking data analysis system job queue 1710 which then connects the asynchronous task request to an available job server 1712. The job server 1712 may then spin up a Golang application process to make a call to the 3rd party API 1718, then add the additional record metadata back into the Columnar database 1706. This leader-worker architecture allows the networking data analysis system to horizontally scale all compute requests related to data enrichment and data analytics, allowing it to concurrently serve thousands of user requests with commodity low-end hardware.

In an embodiment, the system is programmed to execute, for each user submission, creating and storing a new table with corresponding columns and data types in the Columnar DB 1706. Each table may be assigned a unique identifier that is associated with the user or owner and stored in RDBMS 1708, independently or as part of the "File Metadata" table. In one embodiment, an Actions Table stores settings such as a column sort order and filter definitions for a given file using the structure shown below; in all table examples, the character * denotes a primary key.

| Column | Type |
|---|---|
| id * | integer |
| file_void | character varying(256) |
| sort | boolean |
| sort_column | character varying(256) |
| filter | json |

An example of an Enrichments Metadata Table that stores connection information and settings for third-party enrichment services is shown below.

| Column | Type |
|---|---|
| id * | integer |
| eid | integer |
| name | character varying(256) |
| api_url | character varying(256) |
| endpoints | json |
| input_params | json |

An example of an Enrichments Table that stores data retrieved from third-party enrichment services is shown below.

| Column | Type |
|---|---|
| id * | integer |
| name | character varying(256) |

An example of a File Metadata Table that stores file management metadata for users is shown below.

| Column | Type |
|---|---|
| owner | character varying(256) |
| file_rows | integer |
| file_size | character varying(256) |
| file_name | character varying(256) |
| file_void | character varying(256) |
| last_updated | timestamp without time zone |
| deleting | integer |

In an embodiment, the networking data analysis system is programmed to execute operations that can drive a number of analytical outcomes for security investigators. This makes it simple to analyze and enrich massive security data sets. Analysts are able to harness powerful algorithms with ease and leverage machine learning without friction or in depth technical knowledge. In an embodiment, the networking data analysis system provides a common platform for sharing and collaboration. Hunting Guides allow teams to create and share best practices, as well as uplevel skills and automate routine procedures.

In an embodiment, the networking data analysis system allows enterprises to accomplish more with the staff they have in place. They can overcome the need to find "unicorn" security analysts who can also code, manage databases, and perform data science tasks. With the networking data analysis system, security teams can decrease their dependence on IT infrastructure, systems administrators, and data science teams.

13. Implementation Example—Hardware Overview

The techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 18:
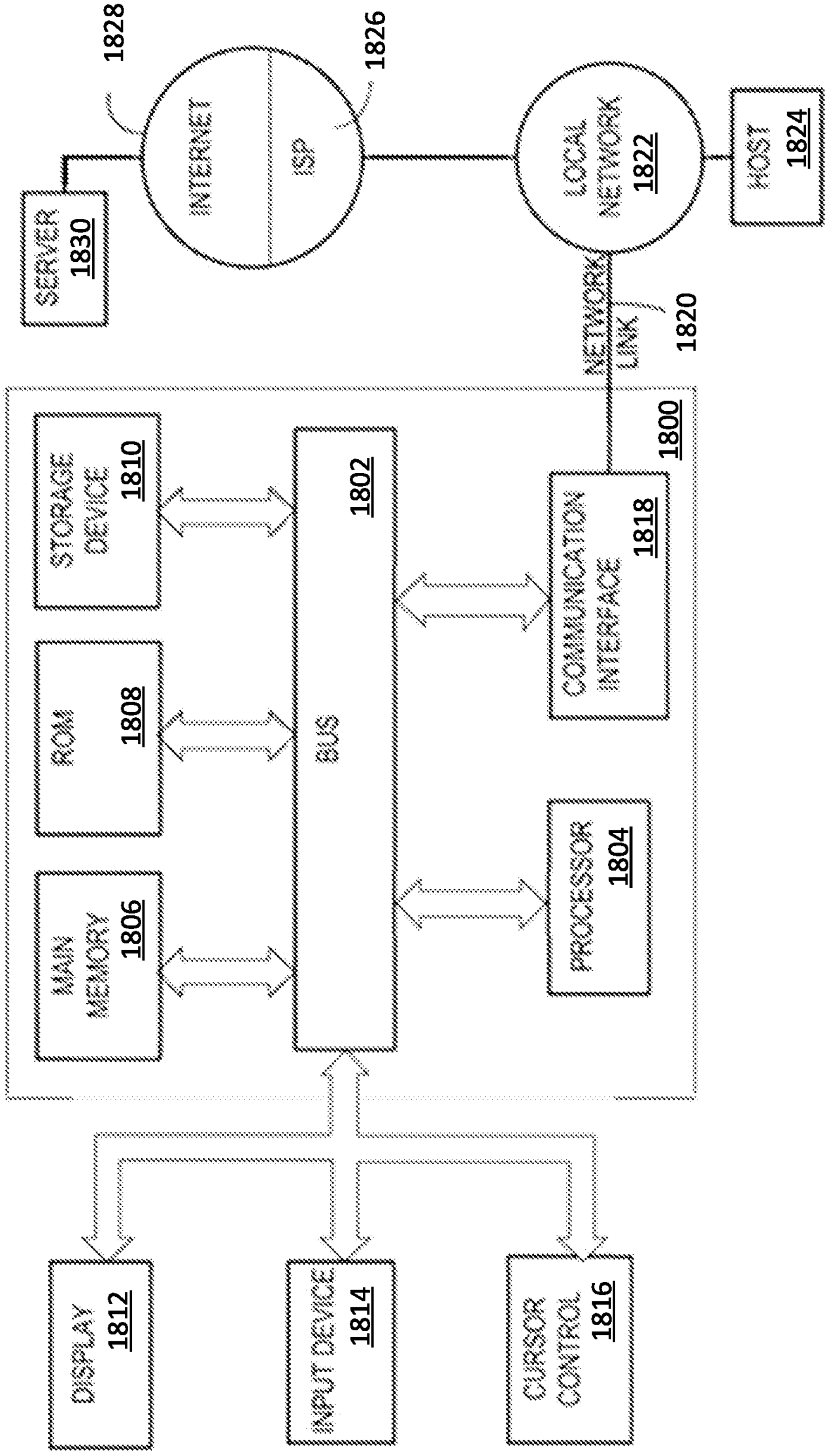
FIG. 18 illustrates an example computer system with which an embodiment can be implemented.

FIG. 18 is a block diagram that illustrates an example computer system with which an embodiment may be implemented.

In the example of FIG. 18, a computer system 1800 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 1800 includes an input/output (I/O) subsystem 1802 which may include a bus and/or other communication mechanism(s) for communicating information and/or instructions between the components of the computer system 1800 over electronic signal paths. The I/O subsystem 1802 may include an I/O controller, a memory controller and at least one I/O port. The electronic signal paths are represented schematically in the drawings, for example as lines, unidirectional arrows, or bidirectional arrows.

At least one hardware processor 1804 is coupled to I/O subsystem 1802 for processing information and instructions. Hardware processor 1804 may include, for example, a general-purpose microprocessor or microcontroller and/or a special-purpose microprocessor such as an embedded system or a graphics processing unit (GPU) or a digital signal processor or ARM processor. Processor 1804 may comprise an integrated arithmetic logic unit (ALU) or may be coupled to a separate ALU.

Computer system 1800 includes one or more units of memory 1806, such as a main memory, which is coupled to I/O subsystem 1802 for electronically digitally storing data and instructions to be executed by processor 1804. Memory 1806 may include volatile memory such as various forms of random-access memory (RAM) or other dynamic storage device. Memory 1806 also may be used for storing temporary variables or other intermediate information during execution of instructions to be executed by processor 1804. Such instructions, when stored in non-transitory computer-readable storage media accessible to processor 1804, can render computer system 1800 into a special-purpose machine that is customized to perform the operations specified in the instructions.

Computer system 1800 further includes non-volatile memory such as read only memory (ROM) 1808 or other static storage device coupled to I/O subsystem 1802 for storing information and instructions for processor 1804. The ROM 1808 may include various forms of programmable ROM (PROM) such as erasable PROM (EPROM) or electrically erasable PROM (EEPROM). A unit of persistent storage 1810 may include various forms of non-volatile RAM (NVRAM), such as FLASH memory, or solid-state storage, magnetic disk or optical disk such as CD-ROM or DVD-ROM and may be coupled to I/O subsystem 1802 for storing information and instructions. Storage 1810 is an example of a non-transitory computer-readable medium that may be used to store instructions and data which when executed by the processor 1804 cause performing computer-implemented methods to execute the techniques herein.

The instructions in memory 1806, ROM 1808 or storage 1810 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 1800 may be coupled via I/O subsystem 1802 to at least one output device 1812. In one embodiment, output device 1812 is a digital computer display. Examples of a display that may be used in various embodiments include a touch screen display or a light-emitting diode (LED) display or a liquid crystal display (LCD) or an e-paper display. Computer system 1800 may include other type(s) of output devices 1812, alternatively or in addition to a display device. Examples of other output devices 1812 include printers, ticket printers, plotters, projectors, sound cards or video cards, speakers, buzzers or piezoelectric devices or other audible devices, lamps or LED or LCD indicators, haptic devices, actuators or servos.

At least one input device 1814 is coupled to I/O subsystem 1802 for communicating signals, data, command selections or gestures to processor 1804. Examples of input devices 1814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 1816, which may perform cursor control or other automated control functions such as navigation in a graphical interface on a display screen, alternatively or in addition to input functions. Control device 1816 may be a touchpad, a mouse, a trackball, or cursor direction keys for communicating direction information and command selections to processor 1804 and for controlling cursor movement on display 1812. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 1814 may include a combination of multiple different input devices, such as a video camera and a depth sensor.

In another embodiment, computer system 1800 may comprise an internet of things (IoT) device in which one or more of the output device 1812, input device 1814, and control device 1816 are omitted. Or, in such an embodiment, the input device 1814 may comprise one or more cameras, motion detectors, thermometers, microphones, seismic detectors, other sensors or detectors, measurement devices or encoders and the output device 1812 may comprise a special-purpose display such as a single-line LED or LCD display, one or more indicators, a display panel, a meter, a valve, a solenoid, an actuator or a servo.

When computer system 1800 is a mobile computing device, input device 1814 may comprise a global positioning system (GPS) receiver coupled to a GPS module that is capable of triangulating to a plurality of GPS satellites, determining and generating geo-location or position data such as latitude-longitude values for a geophysical location of the computer system 1800. Output device 1812 may include hardware, software, firmware and interfaces for generating position reporting packets, notifications, pulse or heartbeat signals, or other recurring data transmissions that specify a position of the computer system 1800, alone or in combination with other application-specific data, directed toward host 1824 or server 1830.

Computer system 1800 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 1800 in response to processor 1804 executing at least one sequence of at least one instruction contained in main memory 1806. Such instructions may be read into main memory 1806 from another storage medium, such as storage 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 1810. Volatile media includes dynamic memory, such as memory 1806. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 1802. Transmission media can also take the form of acoustic or light waves, such as those generated during radio-wave and infra-red data communications.

Various forms of media may be involved in carrying at least one sequence of at least one instruction to processor 1804 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 1800 can receive the data on the communication link and convert the data to a format that can be read by computer system 1800. For instance, a receiver such as a radio frequency antenna or an infrared detector can receive the data carried in a wireless or optical signal and appropriate circuitry can provide the data to I/O subsystem 1802 such as place the data on a bus. I/O subsystem 1802 carries the data to memory 1806, from which processor 1804 retrieves and executes the instructions. The instructions received by memory 1806 may optionally be stored on storage 1810 either before or after execution by processor 1804.

Computer system 1800 also includes a communication interface 1818 coupled to bus 1802. Communication interface 1818 provides a two-way data communication coupling to network link(s) 1820 that are directly or indirectly connected to at least one communication networks, such as a network 1822 or a public or private cloud on the Internet. For example, communication interface 1818 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 1822 broadly represents a local area network (LAN), wide-area network (WAN), campus network, internetwork or any combination thereof. Communication interface 1818 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 1818 sends and receives electrical, electromagnetic or optical signals over signal paths that carry digital data streams representing various types of information.

Network link 1820 typically provides electrical, electromagnetic, or optical data communication directly or through at least one network to other data devices, using, for example, satellite, cellular, Wi-Fi, or BLUETOOTH technology. For example, network link 1820 may provide a connection through a network 1822 to a host computer 1824.

Furthermore, network link 1820 may provide a connection through network 1822 or to other computing devices via internetworking devices and/or computers that are operated by an Internet Service Provider (ISP) 1826. ISP 1826 provides data communication services through a world-wide packet data communication network represented as internet 1828. A server computer 1830 may be coupled to internet 1828. Server 1830 broadly represents any computer, data center, virtual machine or virtual computing instance with or without a hypervisor, or computer executing a containerized program system such as DOCKER or KUBERNETES. Server 1830 may represent an electronic digital service that is implemented using more than one computer or instance and that is accessed and used by transmitting web services requests, uniform resource locator (URL) strings with parameters in HTTP payloads, API calls, app services calls, or other service calls. Computer system 1800 and server 1830 may form elements of a distributed computing system that includes other computers, a processing cluster, server farm or other organization of computers that cooperate to perform tasks or execute applications or services. Server 1830 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 1830 may comprise a web application server that hosts a presentation layer, application layer and data storage layer such as a relational database system using structured query language (SQL) or no SQL, an object store, a graph database, a flat file system or other data storage.

Computer system 1800 can send messages and receive data and instructions, including program code, through the network(s), network link 1820 and communication interface 1818. In the Internet example, a server 1830 might transmit a requested code for an application program through Internet 1828, ISP 1826, local network 1822 and communication interface 1818. The received code may be executed by processor 1804 as it is received, and/or stored in storage 1810, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 1804. While each processor 1804 or core of the processor executes a single task at a time, computer system 1800 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for network security investigations, the method comprising, by one or more computer devices of a networking data analysis system:

receiving, from a client device associated with a user, one or more computer files, each computer file comprising log data;

transforming each of the one or more computer files, the transforming comprising:

converting the log data associated with the computer files into a structured tabular representation of the log data;

parsing the structured tabular representation of the log data to extract data elements associated with the log data and to identify data types associated with the data elements;

creating a columnar representation of the log data based on the identified data types;

storing the columnar representation of the log data in a columnar database;

executing one or more computer-implemented functions on the columnar representation of the log data to identify key networking security metrics;

sending, to the client device, instructions for displaying the identified key networking security metrics associated with the log data of the one or more computer files.

2. The method of claim 1, the transforming further comprising:

extracting metadata associated with the data elements;

storing the extracted metadata in a relational database management system.

3. The method of claim 1, the one or more computer files including a first computer file with a first log data and a second computer file with a second log data.

4. The method of claim 3, the transforming further comprising:

determining, upon receiving a request from the client device to combine the first computer file with the second computer file, that the first computer file is compatible to the second computer file based on one or more of a column order, a column count, and the data types associated with the data elements of the log data;

combining the first computer file with the second computer file into a combined file;

the columnar representation of the log data corresponding to the combined file.

5. The method of claim 3, the transformation further comprising:

determining that the first log data or the second log data comprises a time-based data element that is not formatted in a Coordinated Universal Time (UTC) format;

converting the time-based data element that is not formatted in the UTC format into the UTC format.

6. The method of claim 1, each of the one or more computer-implemented functions for identifying the key networking security metrics being any of:

returning a number of occurrences of each unique value of the log data;

returning a number of occurrences of each unique data element of the data elements;

returning a number of unique elements with a user-specified characteristic of interest divided by a total number of unique data element of the data elements;

returning the log data in a pivot table;

returning a number of occurrences of a pair of two unique values of the log data, the two unique values being separated in two different columns;

returning, for each pair of two unique values of the log data that are in columns specified by a user, respectively, a sum of the pair of two unique values.

7. One or more computer-readable non-transitory storage media of embodying software that is operable for authenticating e-commerce transactions when executed cause one or more processors of an access control server computer to perform:

receive, from a client device associated with a user, one or more computer files, each computer file comprising log data;

transform each of the one or more computer files, the transforming comprising:

converting the log data associated with the computer files into a structured tabular representation of the log data;

parsing the structured tabular representation of the log data to extract data elements associated with the log data and to identify data types associated with the data elements;

creating a columnar representation of the log data based on the identified data types;

storing the columnar representation of the log data in a columnar database;

execute one or more computer-implemented functions on the columnar representation of the log data to identify key networking security metrics;

sending, to the client device, instructions for displaying the identified key networking security metrics associated with the log data of the one or more computer files.

* * * * *